(12) United States Patent
Zhuo et al.

(10) Patent No.: US 12,317,128 B2
(45) Date of Patent: May 27, 2025

(54) DATA TRANSMISSION METHOD AND APPARATUS

(71) Applicant: HUAWEI TECHNOLOGIES CO., LTD., Guangdong (CN)

(72) Inventors: Yibin Zhuo, Shenzhen (CN); Mingzeng Dai, Shenzhen (CN); Jing Liu, Shanghai (CN); Yuanping Zhu, Shanghai (CN); Zhenzhen Cao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 527 days.

(21) Appl. No.: 17/512,905

(22) Filed: Oct. 28, 2021

(65) Prior Publication Data

US 2022/0053370 A1    Feb. 17, 2022

Related U.S. Application Data

(63) Continuation of application No. PCT/CN2020/087781, filed on Apr. 29, 2020.

(30) Foreign Application Priority Data

Apr. 30, 2019   (CN) .......................... 201910363784.7

(51) Int. Cl.
*H04W 28/06* (2009.01)
*H04W 28/02* (2009.01)
(Continued)

(52) U.S. Cl.
CPC ....... *H04W 28/06* (2013.01); *H04W 28/0284* (2013.01); *H04W 28/0289* (2013.01); *H04W 28/12* (2013.01); *H04W 80/02* (2013.01)

(58) Field of Classification Search
CPC . H04W 80/02; H04W 28/06; H04W 28/0284; H04W 28/12
See application file for complete search history.

(56) References Cited

U.S. PATENT DOCUMENTS

| | | | |
|---|---|---|---|
| 2005/0180320 A1* | 8/2005 | Yeh ...................... | H04Q 3/0062 370/412 |
| 2020/0015147 A1* | 1/2020 | Malkamaki ........... | H04L 1/1874 |
| 2021/0127293 A1* | 4/2021 | Hong .................... | H04L 5/0053 |

FOREIGN PATENT DOCUMENTS

| | | |
|---|---|---|
| CN | 104620623 A | 5/2015 |
| WO | 2017008376 A1 | 1/2017 |

OTHER PUBLICATIONS

Ericsson, "UP retransmission status reporting in the NR UP protocol," 3GPP TSG RAN WG3 Meeting #102, R3-187069, Spokane, WA, USA, Nov. 12-16, 2018, 2 pages.
(Continued)

*Primary Examiner* — Elton Williams
(74) *Attorney, Agent, or Firm* — Fish & Richardson P.C.

(57) ABSTRACT

One example method includes receiving, by a first IAB node, N data packets from a donor base station to a terminal device. The first IAB node can determine a PDCP PDU SN of a first data packet in PDCP PDU SNs of the N data packets, where the PDCP PDU SN of the first data packet is a largest PDCP PDU SN in the PDCP PDU SNs of the N data packets, or the PDCP PDU SN of the first data packet is a largest PDCP PDU SN in consecutive PDCP PDU SNs starting from a smallest PDCP PDU SN in the PDCP PDU SNs that are of the N data packets and that are arranged in ascending order. The first IAB node can send first information to the donor base station, where the first information includes a value of the PDCP PDU SN of the first data packet.

9 Claims, 9 Drawing Sheets

(51) Int. Cl.
  *H04W 28/12* (2009.01)
  *H04W 80/02* (2009.01)

(56) References Cited

OTHER PUBLICATIONS

Huawei, "Support of Flow Control for IAB Network," 3GPP TSG-RAN WG3 Meeting #103, R3-190420, Athens, Greece, Feb. 25-Mar. 1, 2018, 3 pages.
Office Action issued in Chinese Application No. 201910363784.7 on Aug. 3, 2021, 19 pages (with English translation).
PCT International Search Report and Written Opinion issued in International Application No. PCT/CN2020/087781 on Aug. 10, 2020, 16 pages (with English translation).
ZTE, Sanechips, "Discussion on flow control in IAB," 3GPP TSG RAN WG2 Meeting #104, R2-1817409, Spokane, USA, Nov. 12-16, 2018, 3 pages.
Extended European Search Report issued in European Application No. 20798084.8 on May 13, 2022, 11 pages.
Huawei, HiSilicon, "Analysis of impact of different ARO modes on PDCP layer," 3GPP TSG-RAN WG2 #103bis, R2-1815533, Chengdu, China, Oct. 8-12, 2018, 6 pages.
Huawei, "Support of flow control for IAB network," 3GPP TSG-RAN WG3 Meeting #103bis, R3-191842, Xi'an, China, Apr. 8-12, 2019, 3 pages.
Samsung, "Clarification on Highest NR PDCP PDU SN," 3GPP TSG-RAN WG3 Meeting #102, R3-186722, Spokane, USA, Nov. 12-16, 2018, 3 pages.
Sequans Communications, "Flow control for PDCP operation," 3GPP TSG-RAN WG2 Meeting #103, R2-1812865, Gothenburg, Sweden, Aug. 20-24, 2018, 4 pages.

\* cited by examiner

DATA TRANSMISSION METHOD AND APPARATUS

CROSS-REFERENCE TO RELATED APPLICATIONS

This application is a continuation of International Application No. PCT/CN2020/087781, filed on Apr. 29, 2020, which claims priority to Chinese Patent Application No. 201910363784.7, filed on Apr. 30, 2019. The aforementioned applications are hereby incorporated by reference in their entireties.

TECHNICAL FIELD

This application relates to the communication field, and more specifically, to a data transmission method and an apparatus in the communication field.

BACKGROUND

A wireless backhaul network, such as an integrated access and backhaul (IAB) network, includes a donor node and a wireless backhaul node, and a terminal device is connected to the donor node via the wireless backhaul node. The IAB network supports multi-hop networking and multi-connectivity networking. Therefore, there may be a plurality of transmission paths between the terminal device and the donor node. On a transmission path, a determined hierarchical relationship exists between the terminal device and a wireless backhaul node that provides a wireless access service for the terminal device, between wireless backhaul nodes, and between a wireless backhaul node and the donor node that provides a backhaul service for the wireless backhaul node. A node that provides a backhaul service for a wireless backhaul node is referred to as a parent node of the wireless backhaul node or the terminal device, or a node that provides an access service for the terminal device is referred to as a parent node of the terminal device, the wireless backhaul node may be considered as a child node of the parent node of the wireless backhaul node, and the terminal device may be considered as a child node of the parent node of the terminal device.

In a user plane protocol of an existing fifth generation (5G) communication system, for example, a new radio (NR) system, if a donor base station is in a form in which a distributed unit (DU) and a centralized unit (CU) are separated, to avoid a packet loss caused by data accumulation on the DU due to congestion occurring in downlink data transmission between the DU and the terminal device, the DU needs to send a downlink data delivery status (DDDS) feedback message to the CU. The DDDS feedback message includes a packet data convergence protocol (PDCP) protocol data unit (PDU) sequence number (SN) of a data packet with a largest PDCP PDU SN in a plurality of data packets sent successfully by the DU to the terminal device in sequence. The DDDS feedback message is at a granularity of a terminal device data radio bearer (DRB), and can be fed back on an IAB node accessed by the terminal device. Therefore, in the IAB network, because one-hop or multi-hop wireless transmission may also exist between the IAB node accessed by the terminal device and the CU, when the IAB node accessed by the terminal device sends a DDDS feedback message to the CU, whether an access link between the terminal device and the IAB node accessed by the terminal device or a backhaul link between the IAB node accessed by the terminal device and the CU is congested cannot be determined.

In a control plane message on an F1 interface for communication between the existing CU and DU, that is, in an F1 interface application protocol (F1AP), each IAB node sends an overload message to the DU, where the overload message indicates two states of the node: overloaded and not overloaded. The CU performs access control of the terminal device by using the overload message. However, the states of the node that are indicated by the overload message are limited, and the CU cannot better allocate, based on the two states, a corresponding resource for data transmission.

Therefore, a technology needs to be provided to effectively improve data transmission performance.

SUMMARY

This application provides a data transmission method and an apparatus, to effectively improve data transmission performance.

According to a first aspect, a data transmission method is provided, and is applied to a communication system including a donor base station and a first IAB node, where the first IAB node is an access node of a terminal device, and the method includes: The first IAB node receives N data packets sent by the donor base station to the terminal device, where N is a positive integer, and N is greater than 1; the first IAB node determines a PDCP PDU SN of a first data packet in PDCP PDU SNs of the N data packets, where the PDCP PDU SN of the first data packet is a largest PDCP PDU SN in the PDCP PDU SNs of the N data packets, or the PDCP PDU SN of the first data packet is a largest PDCP PDU SN in consecutive PDCP PDU SNs starting from a smallest PDCP PDU SN in the PDCP PDU SNs that are of the N data packets and that are arranged in ascending order; and the first IAB node sends first information to the donor base station, where the first information includes a value of the PDCP PDU SN of the first data packet.

The first IAB node receives the N data packets sent by the donor base station to the terminal device, and determines the first data packet in the N data packets. The PDCP PDU SN of the first data packet is the largest PDCP PDU SN in the PDCP PDU SNs of the N data packets, or the PDCP PDU SN of the first data packet is the largest PDCP PDU SN in the consecutive PDCP PDU SNs starting from the smallest PDCP PDU SN in the PDCP PDU SNs that are of the N data packets and that are arranged in ascending order. The first IAB node sends, to the donor base station, a status of the first data packet received by the first IAB node, so that the first IAB node can send statuses of the data packets received by the first IAB node to the donor base station, and the donor base station performs a corresponding operation, thereby effectively improving data transmission performance.

With reference to the first aspect, in a possible implementation, the method further includes: The first IAB node sends second information to the donor base station, where the second information is used to indicate whether a first transmission path is congested or fails, where when the first IAB node communicates with the donor base station via a second IAB node, the first transmission path includes a backhaul link between the first IAB node and the second IAB node and a backhaul link between the second IAB node and the donor base station.

The first IAB node sends, to the donor base station, whether the backhaul link between the first IAB node and the second IAB node and the backhaul link between the second IAB node and the donor base station are congested or fail, so that the donor base station performs a corresponding operation, thereby effectively improving data transmission performance.

With reference to the first aspect, in a possible implementation, when the first IAB node is directly connected to the donor base station, the first transmission path is a backhaul link between the first IAB node and the donor node.

With reference to the first aspect, in a possible implementation, the method further includes: The first IAB node receives third information from the second IAB node, where the third information is used to indicate whether the backhaul link between the second IAB node and the donor base station is congested or fails.

The first IAB node receives a status of whether the backhaul link between the second IAB node and the donor base station is congested or fails, so that the first IAB node subsequently sends, to the donor base station, the status of whether the backhaul link between the second IAB node and the donor base station is congested or fails.

With reference to the first aspect, in a possible implementation, the first information is included in a user plane message on an F1 interface between the first IAB node and the donor base station.

The user plane message on the F1 interface is at a peer F1 protocol layer between the first IAB node and the donor base station.

The user plane message on the F1 interface includes the first information, so that signaling overheads can be reduced.

With reference to the first aspect, in a possible implementation, the second information is included in a user plane message on an F1 interface between the first IAB node and the donor base station.

The user plane message on the F1 interface includes the second information, so that signaling overheads can be reduced.

With reference to the first aspect, in a possible implementation, the user plane message on the F1 interface further includes a first identifier and/or a second identifier, the first identifier is used to indicate that the user plane message on the F1 interface includes the first information, and the second identifier is used to indicate that the user plane message on the F1 interface includes the second information.

The first identifier and/or the second identifier are/is included in the user plane message, so that the donor base station can subsequently correctly obtain a length of the user plane message on the F1 interface through interpretation, and the donor base station can determine whether the user plane message on the F1 interface includes the first information.

According to a second aspect, a data transmission method is provided, and is applied to a communication system including a donor base station and a first IAB node, where the first IAB node is an access node of a terminal device, and the method includes: The donor base station sends N data packets to the first IAB node, where the N data packets are data packets sent by the donor base station to the terminal device, N is a positive integer, and N is greater than 1; the donor base station receives first information sent by the first IAB node, where the first information includes a value of a PDCP PDU SN of a first data packet, and the PDCP PDU SN of the first data packet is a largest PDCP PDU SN in PDCP PDU SNs of the N data packets, or the PDCP PDU SN of the first data packet is a largest PDCP PDU SN in consecutive PDCP PDU SNs starting from a smallest PDCP SN in PDCP PDU SNs that are of the N data packets and that are arranged in ascending order; and the donor base station determines a congestion or failure status of a first transmission path based on the first information, where when the first IAB node communicates with the donor base station via a second IAB node, the first transmission path includes a backhaul link between the first IAB node and the second IAB node and a backhaul link between the second IAB node and the donor base station.

The donor base station sends the N data packets to the first IAB node, and receives the value that is of the PDCP PDU SN of the first data packet and that is sent by the first IAB node. The PDCP PDU SN of the first data packet is the largest PDCP PDU SN in the PDCP PDU SNs of the N data packets or the largest PDCP PDU SN in the consecutive PDCP PDU SNs starting from the smallest PDCP PDU SN in the PDCP PDU SNs that are of the N data packets and that are arranged in ascending order. The donor base station may determine the congestion or failure status of the first transmission path based on the value of the PDCP PDU SN of the first data packet. In this way, the donor base station may determine, based on status of the data packets specifically received by the first IAB node, whether the backhaul link between the first IAB node and the second IAB node and the backhaul link between the second IAB node and the donor base station are congested or fail, to learn a congestion or failure status of the current transmission path.

With reference to the second aspect, in a possible implementation, the method further includes: The donor base station receives second information sent by the first IAB node, where the second information is used to indicate whether the first transmission path is congested or fails.

The donor base station receives a status that is of whether the first transmission path is congested or fails and that is sent by the first IAB node, so that the donor base station learns the congestion or failure status of the first transmission path.

With reference to the second aspect, in a possible implementation, when the first IAB node is directly connected to the donor base station, the first transmission path is a backhaul link between the first IAB node and the donor node.

With reference to the second aspect, in a possible implementation, that the donor base station determines a congestion or failure status of a first transmission path based on the first information includes: The donor base station determines the congestion or failure status of the first transmission path based on the first information and the second information.

With reference to the second aspect, in a possible implementation, that the donor base station determines the congestion or failure status of the first transmission path based on the first information and the second information includes: The donor base station determines, based on the value of the PDCP PDU SN of the first data packet and a value of a PDCP PDU SN of a second data packet that is sent by the donor base station, whether the first transmission path is congested or fails, where the PDCP PDU SN of the second data packet is a largest PDCP PDU SN in PDCP PDU SNs of L data packets already sent by the donor base station, where L≥N, and L is a positive integer; and when the first transmission path is congested or fails, the donor base station determines a congested or failed link on the first transmission path based on the second information.

The donor base station may determine, by comparing the value of the PDCP PDU SN of the first data packet with the value of the PDCP PDU SN of the second data packet, whether the first transmission path is congested or fails. When the first transmission path is congested or fails, the donor base station determines the congested or failed link on the first transmission path based on the second information, so that the donor base station subsequently performs a corresponding operation on the congested or failed link on the first transmission path, and provides data transmission performance.

With reference to the second aspect, in a possible implementation, the method further includes: When there is a congested or failed link on the first transmission path, the donor base station changes a path for the congested or failed link.

When there is a congested or failed link on the first transmission path, the donor base station changes a path for the congested or failed link, to avoid or alleviate congestion on the first transmission path, and improve data transmission performance.

With reference to the second aspect, in a possible implementation, the first information is included in a user plane message on an F1 interface between the first IAB node and the donor base station.

The user plane message on the F1 interface is at a peer F1 protocol layer between the first IAB node and the donor base station.

The user plane message on the F1 interface includes the first information, so that signaling overheads can be reduced.

With reference to the second aspect, in a possible implementation, the second information is included in a user plane message on an F1 interface between the first IAB node and the donor base station.

The user plane message on the F1 interface includes the second information, so that signaling overheads can be reduced.

With reference to the second aspect, in a possible implementation, the user plane message on the F1 interface further includes a first identifier and/or a second identifier, the first identifier is used to indicate that the user plane message on the F1 interface includes the first information, and the second identifier is used to indicate that the user plane message on the F1 interface includes the second information.

The first identifier and/or the second identifier are/is included in the user plane message, so that the donor base station can correctly obtain a length of the user plane message on the F1 interface through interpretation, and the donor base station can determine whether the user plane message on the F1 interface includes the second information.

According to a third aspect, a data transmission method is provided, and is applied to a communication system including a donor base station, a first IAB node, and a second IAB node, where the first IAB node is an access node of a terminal device, the first IAB node communicates with the donor base station via the second IAB node, and the method includes: The first IAB node receives fourth information from the second IAB node, where the fourth information is used to indicate whether a second transmission path is congested or fails, and the second transmission path is a backhaul link between the second IAB node and the donor base station; and the first IAB node sends fifth information to the donor base station, where the fifth information is used to indicate whether a third transmission path is congested or fails, and the third transmission path includes a backhaul link between the first IAB node and the second IAB node and/or the second transmission path.

The first IAB node receives a status that is of whether the second transmission path between the second IAB node and the donor base station and that is sent by the second IAB node, and the first IAB node sends a congestion status of the backhaul link between the first IAB node and the second IAB node and a congestion status of the backhaul link between the second IAB node and the donor base station to the donor base station, so that the donor base station learns of the congestion status of the link between the first IAB node and the second IAB node and the congestion status of the backhaul link between the second IAB node and the donor base station. In this way, the donor base station subsequently performs corresponding measures on the link between the first IAB node and the second IAB node and the backhaul link between the second IAB node and the donor base station.

With reference to the third aspect, in a possible implementation, the fifth information is included in a user plane message on an F1 interface between the first IAB node and the donor base station.

The user plane message on the F1 interface is at a peer F1 protocol layer between the first IAB node and the donor base station.

The user plane message on the F1 interface includes the fifth information, so that signaling overheads can be reduced.

With reference to the third aspect, in a possible implementation, the user plane message on the F1 interface further includes a third identifier, and the third identifier is used to indicate that the user plane message on the F1 interface includes the fifth information.

The third identifier is included in the user plane message on the F1 interface, so that the donor base station can subsequently correctly obtain a length of the user plane message on the F1 interface through interpretation, and the donor base station can determine whether the user plane message on the F1 interface includes the fifth information.

According to a fourth aspect, a data transmission method is provided, and is applied to a communication system including a donor base station, a first IAB node, and a second IAB node, where the first IAB node is an access node of a terminal device, the first IAB node communicates with the donor base station via the second IAB node, and the method includes: The donor base station receives fifth information sent by the first IAB node, where the fifth information is used to indicate whether a third transmission path is congested or fails, and the third transmission path includes a backhaul link between the first IAB node and the second IAB node and/or a backhaul link between the second IAB node and the donor base station; and the donor base station determines a congested or failed link on the third transmission path based on the fifth information.

The donor base station learns of a congestion status of the link between the first IAB node and the second IAB node and a congestion status of the backhaul link between the second IAB node and the donor base station. In this way, the donor base station subsequently performs corresponding measures on the link between the first IAB node and the second IAB node and the backhaul link between the second IAB node and the donor base station.

With reference to the fourth aspect, in a possible implementation, the method further includes: When there is a congested or failed link on the third transmission path, the donor base station changes a path for the congested or failed link.

When there is a congested or failed link on the third transmission path, the donor base station changes a path for the congested or failed link on the third transmission path, to avoid or alleviate congestion on the third transmission path, and improve data transmission performance.

With reference to the fourth aspect, in a possible implementation, the fifth information is included in a user plane message on an F1 interface between the first IAB node and the donor base station.

The user plane message on the F1 interface is at a peer F1 protocol layer between the first IAB node and the donor base station.

The user plane message on the F1 interface includes the fifth information, so that signaling overheads can be reduced.

With reference to the fourth aspect, in a possible implementation, the user plane message on the F1 interface further includes a third identifier, and the third identifier is used to indicate that the user plane message on the F1 interface includes the fifth information.

The third identifier is included in the user plane message, so that the donor base station can correctly obtain a length of the user plane message on the F1 interface through interpretation, and the donor base station can determine whether the user plane message on the F1 interface includes the fifth information.

According to a fifth aspect, a data transmission method is provided, and is applied to a communication system including a donor base station and a first IAB node, and the method includes: The first IAB node determines information about a status level of a fourth transmission path, where the status level of the fourth transmission path includes one of M status levels of the fourth transmission path, where M is greater than or equal to 2, M is a positive integer, and the M status levels of the fourth transmission path are defined based on buffer usage of the fourth transmission path; and the fourth transmission path is a backhaul link between the first IAB node and a parent node of the first IAB node, and/or the fourth transmission path is a backhaul link between the first IAB node and a child node of the first IAB node; and the first IAB node sends sixth information to the donor base station, where the sixth information is used to indicate the status level of the fourth transmission path, and the sixth information is included in a donor base station distributed unit status indication message.

The first IAB node includes the status level that is of the fourth transmission path and that is determined by the first IAB node in the distributed unit status indication message of the donor base station, and sends the distributed unit status indication message to the donor base station, so that signaling overheads can be reduced, and the donor base station learns of the buffer usage of the fourth transmission path.

With reference to the fifth aspect, in a possible implementation, the M status levels of the transmission path are specified in a communication protocol, or the M status levels of the transmission path are configured by the donor base station.

According to a sixth aspect, a data transmission method is provided, and is applied to a communication system including a donor base station and a first IAB node, and the method includes: The donor base station receives sixth information sent by the first IAB node, where the sixth information is used to indicate a status level of the fourth transmission path, the sixth information is included in a donor base station distributed unit status indication message, and the status level of the fourth transmission path includes one of M status levels of the fourth transmission path, where M is greater than or equal to 2, M is a positive integer, and the M status levels of the fourth transmission path are defined based on buffer usage of the fourth transmission path; and the fourth transmission path is a backhaul link between the first IAB node and a parent node of the first IAB node, and/or the fourth transmission path is a backhaul link between the first IAB node and a child node of the first IAB node; and the donor base station reconfigures an uplink-downlink slot resource configuration of the fourth transmission path based on the sixth information.

The donor base station receives the sixth information sent by the first IAB node, where the sixth information indicates the status level of the fourth transmission path, and the donor base station may learn of the buffer usage of the fourth transmission path. In addition, the sixth information is included in the donor base station distributed unit status indication message, so that signaling overheads can be reduced.

With reference to the sixth aspect, in a possible implementation, that the donor base station reconfigures an uplink-downlink slot resource configuration of the fourth transmission path based on the sixth information includes: The donor base station determines the status level of the fourth transmission path based on the sixth information; and the donor base station reconfigures the uplink-downlink slot resource configuration of the fourth transmission path based on the status level of the tburth transmission path.

The donor base station may learn of the buffer usage of the fourth transmission path based on the status level of the fourth transmission path, and the donor base station reconfigures the uplink-downlink slot resource configuration of the fourth transmission path based on the butler usage of the fourth transmission path. Therefore, the donor base station may properly allocate uplink and downlink slot resources of the fourth transmission path based on current buffer usage of the fourth transmission path, thereby improving data transmission performance.

With reference to the sixth aspect, in a possible implementation, that the donor base station reconfigures the uplink-downlink slot resource configuration of the fourth transmission path based on the status level of the fourth transmission path includes: The donor base station reconfigures the uplink-downlink slot resource configuration of the fourth transmission path based on a previous uplink-downlink slot resource configuration of the fourth transmission path.

The donor base station may reconfigure the uplink-downlink slot resource configuration of the fourth transmission path based on the previous uplink-downlink slot resource configuration of the fourth transmission path, to properly allocate the uplink and downlink slot resources of the fourth transmission path, thereby improving the data transmission performance.

With reference to the sixth aspect, in a possible implementation, the M status levels of the transmission path are specified in a communication protocol, or the M status levels of the transmission path are configured by the donor base station.

According to a seventh aspect, a transmission path congestion determining method is provided, and is applied to a communication system including a donor base station and a first IAB node, and the method includes: The donor base station receives seventh information sent by the first IAB node, where the seventh information includes a value of a PDCP PDU SN of a third data packet and a terminal device data radio bearer UE DRB, and the PDCP PDU SN of the third data packet is a largest PDCP PDU SN in PDCP PDU SNs of R data packets successfully sent by the first IAB node to a terminal device in sequence or a largest PDCP PDU SN in PDCP PDU SNs of R data packets sent by the first IAB node to the terminal device, where R is greater than 1, and R is a positive integer; and the donor base station determines a congestion status of a fifth transmission path based on the seventh information, where the fifth transmission path includes a transmission path between the first IAB node and the donor base station and/or an access link between the first IAB node and the terminal device.

With reference to the seventh aspect, in a possible implementation, that the donor base station determines a congestion status of a fifth transmission path based on the seventh information includes: When a difference between the value of the PDCP PDU SN of the third data packet and a value of a PDCP PDU SN of a fourth data packet is greater than or equal to a first threshold, the donor base station determines that the fifth transmission path is congested, where the value of the PDCP PDU SN of the fourth data packet is a largest PDCP PDU SN in PDCP PDU SNs of K data packets sent by the donor base station to the terminal device, K is greater than 1, and K is a positive integer.

With reference to the seventh aspect, in a possible implementation, when the fifth transmission path is congested, the donor base station determines whether a buffer size expected by the UE DRB is greater than or equal to a second threshold; and when the buffer size expected by the UE DRB is greater than or equal to the second threshold, the donor base station may determine that a first backhaul link on the transmission path between the first IAB node and the donor base station is congested, where the first backhaul link is any backhaul link on the transmission path between the first IAB node and the donor base station; or when the buffer size expected by the UE DRB is less than the second threshold, the donor base station determines that the access link between the first IAB node and the terminal device is congested.

With reference to the seventh aspect, in a possible implementation, the first threshold is specified in a communication protocol, or the first threshold is configured by the donor base station.

With reference to the seventh aspect, in a possible implementation, the second threshold is specified in a communication protocol, or the second threshold is configured by the donor base station.

With reference to the seventh aspect, in a possible implementation, the seventh information is included in a user plane message on at F1 interface between the first IAB node and the donor base station.

With reference to the seventh aspect, in a possible implementation, the user plane message on the F1 interface further includes a fourth identifier, and the fourth identifier is used to indicate that the user plane message on the F1 interface includes the seventh information.

According to an eighth aspect, a wireless backhaul link failure indication method is provided, where the method includes: A second IAB node determines wireless backhaul link failure indication information, where the wireless backhaul link failure indication information is used to indicate that a wireless backhaul link between the second IAB node and a parent node of the second IAB node fails or radio resource control (RRC) re-establishment fails; and the second IAB node sends the wireless backhaul link failure indication information to a first node, where the first node is a first IAB node or a terminal device, and the second IAB node is a parent node of the first node.

According to a ninth aspect, a wireless backhaul link failure indication method is provided, where the method includes: A first node receives wireless backhaul link failure indication information sent by a second IAB node, where the wireless backhaul link failure indication information is used to indicate that a wireless backhaul link between the second IAB node and a parent node of the second IAB node fails or RRC re-establishment fails; and the first node triggers RRC re-establishment or cell reselection based on the wireless backhaul link failure indication information.

With reference to the ninth aspect, in a possible implementation, when the first node has only one parent node, the first node determines that a link between the first node and the second IAB node fails or the first node triggers RRC re-establishment.

With reference to the ninth aspect, in a possible implementation, the first node triggers cell reselection when the first node is in an RRC connected state and the first node is in an RRC idle state.

Based on the wireless backhaul link failure indication information, the first node can sense a link status of the backhaul link between the second IAB node and the parent node of the second IAB node. When the backhaul link between the second. IAB node and the parent node of the second IAB node fails or the RRC re-establishment fails, the first node may perform cell reselection or RRC re-establishment in advance, to search for a new parent node for access. This effectively reduces a time period of data transmission interruption caused by the link failure of the backhaul link between the second IAB node and the parent node of the second IAB node or the RRC re-establishment failure.

According to a tenth aspect, an apparatus used in a wireless backhaul network is provided, where the wireless backhaul network includes a donor base station and a first IAB node, and the apparatus includes: a transceiver unit, configured to receive N data packets sent by the donor base station to a terminal device, where N is a positive integer, and N is greater than 1; and a processing unit, configured to determine a PDCP PDU SN of a first data packet in PDCP PDU SNs of the N data packets, where the PDCP PDU SN of the first data packet is a largest PDCP PDU SN in the PDCP PDU SNs of the N data packets, or the PDCP PDU SN of the first data packet is a largest PDCP PDU SN in consecutive PDCP PDU SNs starting from a smallest PDCP PDU SN in the PDCP SNs that are of the N data packets and that are arranged in ascending order, where the transceiver unit is further configured to send first information to the donor base station, where the first information includes a value of the PDCP PDU SN of the first data packet.

With reference to the tenth aspect, in a possible implementation, the transceiver unit is further configured to send second information to the donor base station, where the second information is used to indicate whether a first transmission path is congested or fails, where when the apparatus communicates with the donor base station via a second IAB node, the first transmission path includes a backhaul link between the apparatus and the second IAB node and a backhaul link between the second IAB node and the donor base station.

With reference to the tenth aspect, in a possible implementation, when the apparatus is directly connected to the donor base station, the first transmission path is a backhaul link between the first IAB node and the donor node.

With reference to the tenth aspect, in a possible implementation, the transceiver unit is further configured to receive third information from the second IAB node, where the third information is used to indicate whether the backhaul link between the second IAB node and the donor base station is congested or fails.

With reference to the tenth aspect, in a possible implementation, the first information is included in a user plane message on an F1 interface between the first IAB node and the donor base station.

With reference to the tenth aspect, in a possible implementation, the second information is included in a user plane message on an F1 interface between the first IAB node and the donor base station.

With reference to the tenth aspect, in a possible implementation, the user plane message on the F1 interface further includes a first identifier and/or a second identifier, the first identifier is used to indicate that the user plane message on the F1 interface includes the first information, and the second identifier is used to indicate that the user plane message on the F1 interface includes the second information.

According to an eleventh aspect, an apparatus used in a wireless backhaul network is provided, where the wireless backhaul network includes a donor base station and a first IAB node, and the apparatus includes: a transceiver unit, configured to send N data packets to the first IAB node, where the N data packets are data packets sent by the donor base station to a terminal device, N is a positive integer, and N is greater than 1; and the transceiver unit is further configured to receive first information sent by the first IAB node, where the first information includes a value of a PDCP PDU SN of a first data packet, and the PDCP PDU SN of the first data packet is a largest PDCP PDU SN in PDCP PDU SNs of the N data packets, or the PDCP PDU SN of the first data packet is a largest PDCP PDU SN in consecutive PDCP PDU SNs starting from a smallest PDCP PDU SN in PDCP PDU SNs that are of the N data packets and that are arranged in ascending order; and a processing unit, configured to determine a congestion or failure status of a first transmission path based on the first information, where when the first IAB node communicates with the apparatus via a second IAB node, the first transmission path includes a backhaul link between the first IAB node and the second IAB node and a backhaul link between the second IAB node and the apparatus.

With reference to the eleventh aspect, in a possible implementation, the apparatus further includes: the transceiver unit is further configured to receive second information sent by the first IAB node, where the second information is used to indicate whether the first transmission path is congested or fails.

With reference to the eleventh aspect, in a possible implementation, when the first IAB node is directly connected to the apparatus, the first transmission path is a backhaul link between the first IAB node and the apparatus.

With reference to the eleventh aspect, in a possible implementation, the processing unit is specifically configured to determine the congestion or failure status of the first transmission path based on the first information and the second information.

With reference to the eleventh aspect, in a possible implementation, the processing unit is further specifically configured to determine, based on the value of the PDCP PDU SN of the first data packet and a value of a PDCP PDU SN of a second data packet sent by the apparatus, whether the first transmission path is congested or fails, where the PDCP PDU SN of the second data packet is a largest PDCP PDU SN in PDCP PDU SNs of L data packets already sent by the apparatus, where L≥N, and L is a positive integer; and when the first transmission path is congested or fails, the processing unit is further specifically configured to determine, a congested or failed link on the first transmission path based on the second information.

With reference to the eleventh aspect, in a possible implementation, when there is a congested or failed link on the first transmission path, the processing unit is further configured to change a path for the congested or failed link.

With reference to the eleventh aspect, in a possible implementation, the first information is included in a user plane message on an F1 interface between the first IAB node and the donor base station.

With reference to the eleventh aspect, in a possible implementation, the second information is included in a user plane message on an F1 interface between the first IAB node and the donor base station.

With reference to the eleventh aspect, in a possible implementation, the user plane message on the F1 interface further includes a first identifier and/or a second identifier, the first identifier is used to indicate that the user plane message on the F1 interface includes the first information, and the second identifier is used to indicate that the user plane message on the F1 interface includes the second information.

According to a twelfth aspect, an apparatus used in a wireless backhaul network is provided, where the wireless backhaul network includes a donor base station, a first IAB node, and a second IAB node in a communication system, the first IAB node is an access node of a terminal device, the first IAB node communicates with the donor base station via the second IAB node, and the apparatus includes: a transceiver unit, configured to receive fourth information from the second IAB node, where the fourth information is used to indicate whether a second transmission path is congested or fails, and the second transmission path is a backhaul link between the second IAB node and the donor base station; and the transceiver unit is further configured to send fifth information to the donor base station, where the fifth information is used to indicate whether a third transmission path is congested or fails, and the third transmission path includes a backhaul link between the first IAB node and the second IAB node and the second transmission path.

With reference to the twelfth aspect, in a possible implementation, the fifth information is included in a user plane message on an F1 interface between the first IAB node and the donor base station.

With reference to the twelfth aspect, in a possible implementation, the user plane message on the F1 interface further includes a third identifier, and the third identifier is used to indicate that the user plane message on the F1 interface includes the fifth information.

According to a thirteenth aspect, an apparatus used in a wireless backhaul network is provided, where the wireless backhaul network includes a donor base station, a first IAB node, and a second IAB node in a communication system, the first IAB node is an access node of a terminal device, the first IAB node communicates with the donor base station via the second IAB node, and the apparatus includes: a transceiver unit, configured to receive fifth information sent by the first IAB node, where the fifth information is used to indicate whether a third transmission path is congested or fails, and the third transmission path includes a backhaul link between the first IAB node and the second IAB node and a backhaul link between the second IAB node and the donor base station; and a processing unit, configured to determine, a congested or failed link on the third transmission path based on the fifth information.

With reference to the thirteenth aspect, in a possible implementation, when there is a congested or failed link on the third transmission path, the processing unit is further configured to change a path for the congested or failed link.

With reference to the thirteenth aspect, in a possible implementation, the fifth information is included in a user plane message on an F1 interface between the first IAB node and the donor base station.

With reference to the thirteenth aspect, in a possible implementation, the user plane message on the F1 interface further includes a third identifier, and the third identifier is used to indicate that the user plane message on the F1 interface includes the fifth information.

According to a fourteenth aspect, an apparatus used in a wireless backhaul network is provided, and is applied to a communication system including a donor base station and a first IAB node, and the apparatus includes: a processing unit, configured to determine information about a status level of a fourth transmission path, where the status level of the fourth transmission path includes one of M status levels of the fourth transmission path, where M is greater than or equal to 2 M is a positive integer, and the M status levels of the fourth transmission path are defined based on buffer usage of the fourth transmission path; and the fourth transmission path is a backhaul link between the first IAB node and a parent node of the first IAB node, and/or the fourth transmission path is a backhaul link between the first IAB node and a child node of the first IAB node; and a transceiver unit, configured to send sixth information to the donor base station, where the sixth information is used to indicate the status level of the fourth transmission path, and the sixth information is included in a donor base station distributed unit status indication message.

With reference to the fourteenth aspect, in a possible implementation, the M status levels of the transmission path are specified in a communication protocol, or the M status levels of the transmission path are configured by the donor base station.

According to a fifteenth aspect, an apparatus used in a wireless backhaul network is provided, and is applied to a communication system including a donor base station and a first IAB node, and the apparatus includes: a transceiver unit, configured to receive sixth information sent by the first IAB node, where the sixth information is used to indicate a status level of the fourth transmission path, the sixth information is included in a donor base station distributed unit status indication message, and the status level of the fourth transmission path includes one of M status levels of the fourth transmission path, where M is greater than or equal to 2, M is a positive integer, and the M status levels of the fourth transmission path are defined based on buffer usage of the fourth transmission path; and the fourth transmission path is a backhaul link between the first IAB node and a parent node of the first IAB node, and/or the fourth transmission path is a backhaul link between the first IAB node and a child node of the first IAB node; and a processing unit, configured to reconfigure an uplink-downlink slot resource configuration of the fourth transmission path based on the sixth information.

With reference to the fifteenth aspect, in a possible implementation, the processing unit is specifically configured to determine the status level of the fourth transmission path based on the sixth information; and the processing unit is further specifically configured to reconfigure the uplink-downlink slot resource configuration of the fourth transmission path based on the status level of the fourth transmission path.

With reference to the fifteenth aspect, in a possible implementation, the processing unit is further specifically configured to reconfigure the uplink-downlink slot resource configuration of the fourth transmission path based on a previous uplink-downlink slot resource configuration of the fourth transmission path.

With reference to the fifteenth aspect, in a possible implementation, the M status levels of the transmission path are specified in a communication protocol, or the M status levels of the transmission path are configured by the donor base station.

According to a sixteenth aspect, a transmission path congestion determining apparatus is provided, and is applied to a communication system including a donor base station and a first IAB node, and the apparatus includes: a transceiver unit, configured to receive seventh information sent by the first IAB node, where the seventh information includes a value of a PDCP PDU SN of a third data packet and a terminal device data radio bearer UE DRB, and the PDCP PDU SN of the third data packet is a largest PDCP PDU SN in PDCP PDU SNs of R data packets successfully sent by the first IAB node to a terminal device in sequence or a largest PDCP PDU SN in PDCP PDU SNs of R data packets sent by the first IAB node to the terminal device, where R is greater than 1, and R is a positive integer; and a processing unit, configured to determine a congestion status of a fifth transmission path based on the seventh information, where the fifth transmission path includes a transmission path between the first IAB node and the donor base station and/or an access link between the first IAB node and the terminal device.

With reference to the sixteenth aspect, in a possible implementation, when a difference between the value of the PDCP PDU SN of the third data packet and a value of a PDCP PDU SN of a fourth data packet is greater than or equal to a first threshold, the processing unit is further specifically configured to determine that the fifth transmission path is congested, where the value of the PDCP PDU SN of the fourth data packet is a largest PDCP PDU SN in PDCP PDU SNs of data packets sent by the donor base station to the terminal device, K is greater than 1, and K is a positive integer.

With reference to the sixteenth aspect, in a possible implementation, when the fifth transmission path is congested, the processing unit is further specifically configured to determine whether a buffer size expected by the UE DRB is greater than or equal to a second threshold; and when the buffer size expected by the UE DRB is greater than or equal to the second threshold, the processing unit is specifically configured to determine that a first backhaul link on the transmission path between the first IAB node and the donor base station is congested, where the first backhaul link is any backhaul link on the transmission path between the first IAB node and the donor base station; or when the buffer size expected by the UE DRB is less than the second threshold, the processing unit is specifically configured to determine that the access link between the first IAB node and the terminal device is congested.

With reference to the sixteenth aspect, in a possible implementation, the first threshold is specified in a communication protocol, or the first threshold is configured by the donor base station.

With reference to the sixteenth aspect, in a possible implementation, the second threshold is specified in a communication protocol, or the second threshold is configured by the donor base station.

With reference to the sixteenth aspect, in a possible implementation, the seventh information is included in a user plane message on an F1 interface between the first IAB node and the donor base station.

With reference to the sixteenth aspect, in a possible implementation, the user plane message on the F1 interface further includes a fourth identifier, and the fourth identifier is used to indicate that the user plane message on the F1 interface includes the seventh information.

According to a seventeenth aspect, a wireless backhaul link failure indication apparatus is provided, where the apparatus includes: a processing unit, configured to determine wireless backhaul link failure indication information, where the wireless backhaul link failure indication information is used to indicate that a wireless backhaul link between the second IAB node and a parent node of the second IAB node fails or RRC re-establishment fails; and a transceiver unit, configured to send the wireless backhaul link failure indication information to a first node, where the first node is a first IAB node or a terminal device, and the second IAB node is a parent node of the first node.

According to an eighteenth aspect, a wireless backhaul link failure indication apparatus is provided, where the apparatus includes: a transceiver unit, configured to receive wireless backhaul link failure indication information sent by a second IAB node, where the wireless backhaul link failure indication information is used to indicate that a wireless backhaul link between the second IAB node and a parent node of the second IAB node fails or RRC re-establishment fails; and a processing unit, configured to trigger RRC re-establishment or cell reselection based on the wireless backhaul link failure indication information.

With reference to the eighteenth aspect, in a possible implementation, when the apparatus has only one parent node, the processing unit is specifically configured to determine that a link between a first node and the second IAB node fails or the processing unit further specifically triggers RRC re-establishment.

With reference to the eighteenth aspect, in a possible implementation, the processing unit is further specifically configured to trigger cell reselection when the apparatus is in an RRC connected state and the apparatus is in an RRC idle state.

According to a nineteenth aspect, another apparatus used in a wireless backhaul network is provided. The apparatus includes a transceiver, a memory, and a processor. The transceiver, the memory, and the processor communicate with each other through an internal connection path. The memory is configured to store instructions. The processor is configured to execute the instructions stored in the memory, to control a receiver to receive a signal, and control a transmitter to send a signal. In addition, when the processor executes the instructions stored in the memory, the processor is enabled to perform the method according to any one of the possible implementations of either of the foregoing aspects.

According to a twentieth aspect, a computer program product is provided. The computer program product includes computer program code and when the computer program code is run on a computer, the computer is enabled to perform the methods according to the foregoing aspects.

According to a twenty-first aspect, a computer-readable medium is provided. The computer-readable medium is configured to store a computer program, and the computer program includes instructions used to perform the methods according to the foregoing aspects.

According to a twenty-second aspect, a chip is provided. The chip includes an input interface, an output interface, a processor, and a memory. The input interface, the output interface, the processor, and the memory are connected to each other through an internal connection path. The processor is configured to execute code in the memory. When the code is executed, the processor is configured to perform the methods according to the foregoing aspects.

DESCRIPTION OF EMBODIMENTS

The following describes the technical solutions of this application with reference to the accompanying drawings.

Names of all nodes and messages in this application are merely names that are set for ease of description, and names in an actual network may be different. It should not be understood that names of various nodes and messages are limited in this application. On the contrary, any name having a function the same as or similar to that of a node or a message used in this application is considered as a method or an equivalent replacement of this application, and shall fall within the protection scope of this application. Details are not described below.

The communication system mentioned in the embodiments of this application includes but is not limited to a narrowband Internet of Things (NB-IoT) system, a wireless local area network (WLAN) system, an LTE system, a next-generation 5G mobile communication system, or an evolved communication system after 5G.

Figure 1:
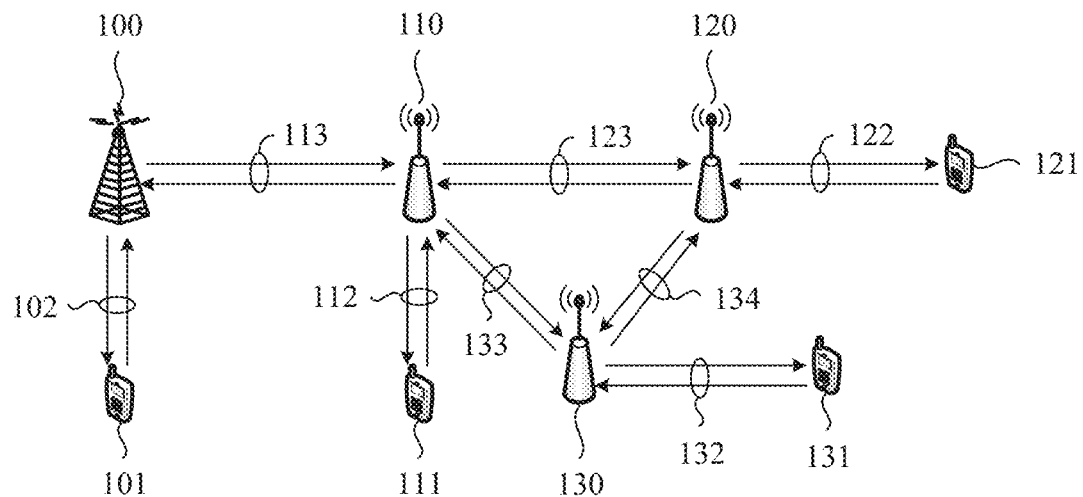
FIG. 1 is an architectural diagram of an IAB system to which technical solutions of this application are applicable.

FIG. 1 is an architectural diagram of an IAB system to which technical solutions of this application are applicable. As shown in FIG. 1, an IAB system includes at least: one base station 100, one or more terminal devices (terminal) 101 served by the base station 100, one or more relay nodes (also namely, nodes) 110, and one or more terminal devices 111 served by the IAB nodes 110. Generally, the base station 100 is referred to as a donor base station (e.g. donor next generation node B (DgNB)), and the IAB node 110 is connected to the base station 100 through a wireless backhaul link 113. The donor base station is also referred to as a donor node in this application.

The base station 100 includes but is not limited to an evolved NodeB (eNB), a radio network controller (RNC), a node B (NB), a base station controller (BSC), a base transceiver station (BTS), a home base station (e.g. home evolved NodeB, or home node B (HMB)), a baseband unit (BBL), an evolved (eLTE) base station, and an NR next generation NodeB (gNB).

The terminal device includes but is not limited to any one of user equipment (UE), a mobile station, an access terrrrinal, a subscriber unit, a subscriber station, a mobile station, a remote station, a remote terminal, a mobile device, a terminal, a wireless communication device, a user agent, a station (ST) in WLAN, a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a mobile station in a 5G network, a terminal device in a future evolved public land mobile network (PLMN), and the like. The IAB node is a specific name of the relay node, constitutes no limitation on the solutions of this application, and may be a network type relay (for example, a base station) having a forwarding function or a terminal type relay having a forwarding function, for example, in a terminal device.

The IAB system may further include a plurality of other IAB nodes, for example, an IAB node 120 and an IAB node 130. The node 120 is connected to the IAB node 110 through a wireless backhaul link 123, to connect to a network. The IAB node 130 is connected to the IAB node 110 through a wireless backhaul link 133, to connect to the network. The IAB node 120 serves one or more terminal devices 121, and the IAB node 130 serves one or more terminal devices 131. In FIG. 1, both the IAB node 110 and the IAB node 120 are connected to the network through the wireless backhaul links. In this application, each wireless backhaul link is viewed from a perspective of a relay node. For example, the wireless backhaul link 113 is a backhaul link of the IAB node 110, and the wireless backhaul link 123 is a backhaul link of the IAB node 120. As shown in FIG. 1, one IAB node, for example, the IAB node 120, may be connected to another IAB node 110 by using a wireless backhaul link, for example, the wireless backhaul link 123, to connect to the network. In addition, the relay node may be connected to the network by using a plurality of wireless relay nodes. It should be understood that the IAB node in this application is merely used for a purpose of description, and does not indicate that the solutions of this application are used only in an NR scenario. In this application, the IAB node may generally be any node or device having a relay function. It should be understood that the IAB node and the relay node in this application have a same meaning.

In addition, the following basic terms or concepts are further involved in this application.

1. Wireless Backhaul Node and Donor Node

In the embodiments of this application, a node that supports integrated access and backhaul is referred to as a wireless backhaul node. In an LIE communication system, the wireless backhaul node may also be referred to as a relay node (RN), and in 5G, the wireless backhaul node may also be referred to as an IAB node. For ease of description, the IAB node is used as an example for description below.

The IAB node may provide a wireless access service for the terminal device, and data (which may include user plane data and control plane signaling) of the terminal device transmitted by connecting the IAB node to the donor node through a wireless backhaul link.

In the embodiments of this application, the donor node is also referred to as an IAB donor or a donor base station (e.g. DgNB). Specifically, the DgNB may be an access network element having a complete base station function, or may be an access network element in a form in which a CU is separated from a DU. The DgNB is connected to a core network element serving the terminal device, for example, connected to a 5G core (5GC), and provides a wireless backhaul function for the IAB node. For ease of description, in the embodiments of this specification, a centralized unit of a donor node is referred to as a donor CU for short, and a distributed unit of the donor node is referred to as a donor DU for short. The donor CU may also be in a form in which a control plane (CP) is separated from a user plane (UP). For example, one CU includes one CU-CP and a plurality of CU-UPs. This is not limited in the embodiments of this application.

2. Parent Node and Child Node

An IAB network may support multi-hop networking and multi-connectivity networking. Therefore, there may be a plurality of transmission paths between the terminal device and the donor node. On a transmission path, a determined hierarchical relationship exists between a terminal device and an IAB node that provides a wireless access service for the terminal device, between IAB nodes, and between an IAB node and a donor node that provides a backhaul service for the IAB node. A node that provides a wireless backhaul service for the IAB node is referred to as a parent node of the IAB node, or a node that provides a wireless access service for a terminal device is referred to as a parent node of the terminal device, the IAB node may be considered as a child node of the parent node of the IAB node, and the terminal device may be considered as a child node of the parent node of the terminal device. Herein, the parent node of the IAB node may be another IAB node, or may be a donor node. When the IAB node directly communicates with the donor node by using a radio air interface, the parent node of the IAB node is the donor node.

3. Access Link

A wireless link used when the terminal device communicates with a node (for example, an IAB node, a donor node, or a donor DU) providing a wireless access service for the terminal device includes an access link used for uplink transmission and an access link used for downlink transmission. The access link used for uplink transmission is also referred to as an uplink access link or an access uplink, and a transmission direction of the access link is from the terminal device to the node. The access link used for downlink transmission is also referred to as a downlink access link or an access downlink, and a transmission direction of the access link is from the node to the terminal device.

4. Backhaul Link

A backhaul link is a wireless link used when an IAB node communicates with a parent node of the IAB node. The parent node of the IAB node may be an IAB node or a donor node, and the backhaul link includes a backhaul link used for uplink transmission and a backhaul link used for downlink transmission. The backhaul link used for uplink transmission is also referred to as an uplink backhaul link or a backhaul uplink, and a transmission direction of the backhaul link is from the IAB node to the parent node of the IAB node. The backhaul link used for downlink transmission is also referred to as a downlink backhaul link or a backhaul downlink, and a transmission direction of the backhaul link is from the parent node of the IAB node to the IAB node.

5. Transmission Path

The transmission path is a full route from a sending node to a receiving node. The path includes at least one link. In the embodiments of this application, the link represents a connection between neighboring nodes. In other words, the transmission path is a transmission path that is between the sending node and the receiving node and that uses the sending node as a start point and uses the receiving node as an end point. Subsequently, for ease of description, the transmission path that is between the sending node and the receiving node and that uses the sending node as a start point and uses the receiving node as an end point may be described as a transmission path between the sending node and the receiving node.

In uplink transmission, any node that is between the terminal device and the donor node and that is different from the donor node may be used as the sending node, and an upstream node (for example, a parent node of the sending node or a parent node of the parent node) of the sending node is used as the receiving node. For example, the sending node may be an IAB node, the receiving node may be a parent node of the IAB node, and a full route between the IAB node and the parent node of the IAB node represents a transmission path. For another example, the sending node may be an IAB node, the receiving node may be the donor node, and a full route between the IAB node and the donor node represents a transmission path.

Likewise, in downlink transmission, the sending node may be any node that is between the donor node and the terminal device and that is different from the terminal device, and the receiving node may be a downstream node (for example, a child node of the sending node or a child node of the child node) of the sending node. For example, the sending node may be an IAB node, the receiving node may be a child node of the IAB node, and a full route between the IAB node and the child node of the IAB node represents a transmission path. For another example, the sending node may be an IAB node, the receiving node may be the terminal device, and a full route between the IAB node and the terminal device represents a transmission path.

6. Backhaul Link Congestion or Failure

The backhaul link congestion includes congestion in an uplink transmission direction and congestion in a downlink transmission direction of a backhaul link. If buffer usage, load usage, or a buffer amount of data that is sent to a parent node in uplink transmission of an IAB node exceeds a specific threshold, it may be considered that congestion occurs in an uplink transmission direction of a backhaul link between the IAB node and a parent node of the IAB node. If buffer usage or a buffer amount sent to a child node in downlink transmission of the IAB node exceeds a specific threshold, it may be considered that congestion occurs in a downlink transmission direction of a backhaul link between the IAB node and a child node of the IAB node. The child node is another IAB node.

The backhaul link failure means that a radio link failure (RLF) occurs on a backhaul link, and may be caused by expiration of a timer T310, a random access problem indication of a media access control (MAC) layer, or a maximum quantity of retransmissions that is reached at a radio link control layer (RLC) layer.

Generally, a downstream node may be considered as a terminal device of an upstream node. It should be understood that, in the integrated access and backhaul system shown in FIG. 1, one IAB node is connected to one upstream node. In a future relay system, to improve reliability of a wireless backhaul link, one IAB node, for example, the IAB node 120, may be served by a plurality of upstream nodes. The IAB node 130 in FIG. 1 may further be connected to the IAB node 120 by using a backhaul link 134, that is, both the IAB node 110 and the IAB node 120 are considered as upstream nodes of the IAB node 130. Names of the IAB nodes 110, 120, and 130 do not constitute a limitation on a scenario or a network in which the IAB nodes 110, 120, and 130 are deployed, and there may be any other name such as a relay or an RN. Using the IAB node in this application is merely for ease of description.

In FIG. 1, wireless links 102, 112, 122, 132, 113, 123, 133, and 134 may be bidirectional links, including upli.nkldownlink transmission links. Specifically, the wireless backhaul links 113, 123, 133, and 134 may be used by an upstream node to provide a service for a downstream node, for example, used by the upstream node 100 to provide a wireless backhaul service for the downstream node 110. It should be understood that an uplink and a downlink of a backhaul link may be separated. In other words, transmission on the uplink and transmission on the downlink are performed by different nodes. The downlink transmission means that an upstream node, for example, the node 100, transmits information or data to a downstream node, for example, the node 110, and the uplink transmission means that a downstream node, for example, the node 110, transmits information or data to an upstream node, for example, the node 100. The node is not limited to a network node or a terminal device. For example, in a D2D scenario, a terminal device may serve as a relay node to serve another terminal device. The wireless backhaul link may be alternatively an access link in some scenarios. For example, the backhaul link 123 may be alternatively considered as an access link for the node 110, and the backhaul link 113 may be alternatively an access link for the node 100. It should be understood that the upstream node may be a base station or a relay node, and the downstream node may be a relay node or a terminal device having a relay function. For example, in the D2D scenario, the downstream node may be a terminal device.

Figure 2:
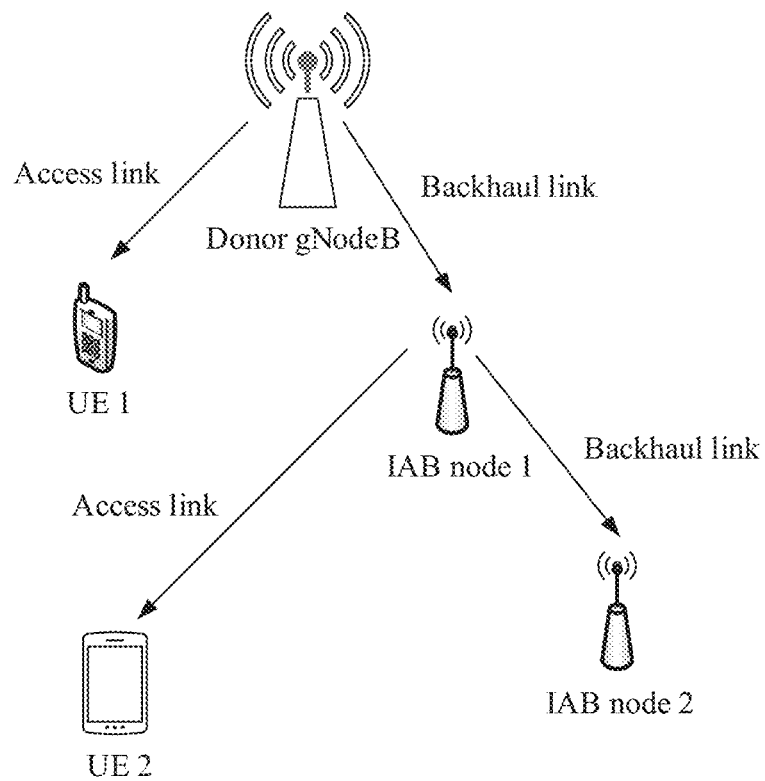
FIG. 2 is a specific example of an IAB system.

FIG. 2 shows a specific example of an IAB system. Ihe IAB system shown in FIG. 2 includes a donor base station, an IAB node 1, and an IAB node 2, and may further include UE 1 and UE 2. A link between the donor base station and the IAB node 1, and a link between the IAB node 1 and the IAB node 2 are backhaul links. A link between the UE 1 and the donor base station, a link between the UE 2 and the IAB node 1, and a link between UE 3 and the IAB node 2 are access links.

Figure 3:
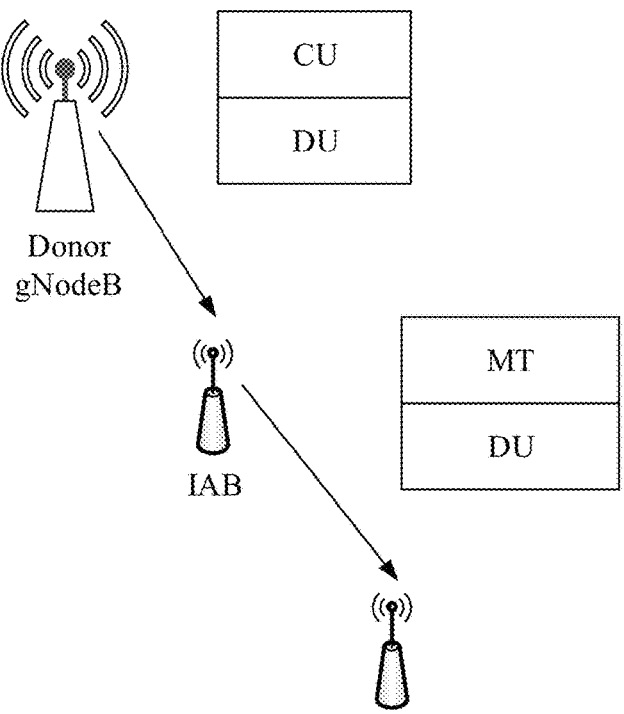
FIG. 3 is a schematic structural diagram of an IAB node.

FIG. 3 is a schematic structural diagram of an IAB node. As shown in FIG. 3, a mobile terminal (MT) is defined as a component similar to UE. In the IAB, the MT is referred to as a function that camps on the IAB node. Because the MT has a function similar to a function of ordinary UE, it may be considered that the IAB node accesses an upstream node or a network via the MT.

A DU function is described relative to a CU function. In NR, a function of a base station is divided into two parts, which is referred to as CU-DU separation. From a perspective of a protocol stack, a CU includes an RRC layer and a PDCP layer of an LIE base station, and a DU includes a radio link control (RLC) layer, a media access control (MAC) layer, and a physical (PHY) layer of the LTE base station. In common 5G base station deployment, a CU and a DU may be physically connected by using an optical fiber, and logically there is a specially defined F1 interface used for communication between the CU and the DU. From a perspective of functions, the CU is mainly responsible for radio resource control and configuration, inter-cell mobility management, bearer management, and the like. The DU is mainly responsible for scheduling, and generating and sending physical signals.

As described in the background, during data transmission in the IAB network, in an existing new radio (NR) user plane protocol, if a donor base station is in a form in which a DU and a CU are separated, to avoid a packet loss caused by data accumulation on the DU due to congestion occurring in downlink data transmission between the DU and the terminal device, the DU needs to send a DDDS feedback message to the CU. The DDDS feedback message includes a PDCP PDU SN of a data packet with a largest PDCP PDU SN in a plurality of data packets sent successfully by the DU to the terminal device in sequence. The DDDS feedback message is at a granularity of a terminal device data radio bearer (DRB), and can be fed back on an IAB node accessed by the terminal device. Therefore, in the IAB network, because one-hop or multi-hop wireless transmission may also exist between the IAB node accessed by the terminal device and the CU, when the IAB node accessed by the terminal device sends a DDDS feedback message to the CU, whether an access link between the terminal device and the IAB node accessed by the terminal device or a backhaul link between the IAB node accessed by the terminal device and the CU is congested cannot be determined. In a control plane message on an F1 interface for communication between the existing CU and DU, that is, in an F1 interface application protocol (F1AP), each IAB node sends an overload message to the DU, where the overload message indicates two states of the node, overloaded and not overloaded. The CU performs access control of the terminal device by using the overload message. However, the states of the node that are indicated by the overload message are limited, and the CU cannot better allocate, based on the two states, a corresponding resource for data transmission.

In view of the foregoing problem, the embodiments of this application provide a data transmission method, to effectively improve data transmission performance.

For ease of understanding of the embodiments of this application, the following descriptions are provided before the embodiments of this application are described.

First, in the embodiments of this application, the "indication" may include a direct indication and an indirect indication, or may include an explicit indication and an implicit indication. Information indicated by using a piece of information (for example, first indication information described below) is referred to as to-be-indicated information. In a specific implementation process, the to-be-indicated information is indicated in a plurality of manners, for example, but not limited to, a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already learned of or pre-agreed on. For example, specific information may also be indicated by using a pre-agreed (for example, stipulated in a protocol) arrangement sequence of various pieces of information, to reduce indication overheads to some extent.

Second, in the embodiments shown below, "first", "second", and various numerical numbers are merely used for distinguishing for ease of description, and are not used to limit the scope of the embodiments of this application. For example, different indication information is distinguished.

Third, the "protocol" in the embodiments of this application may be a standard protocol in the communication field, for example, may include an LTE protocol, an NR protocol, and a related protocol applied to a future communication system. This is not limited in this application.

Fourth, "a plurality of" mentioned in the embodiments of this application means two or more. "One or more of the following items (pieces)" or a similar expression thereof refers to any combination of these items, including any combination of singular items (pieces) or plural items (pieces). For example, at least one (piece) or a plurality (pieces) of a, b, or c may indicate: a, b, c, a and b, a and c, b and c, or a, b, and c, where a, b, and c may be singular or plural. The method provided in the embodiments of this application is described in detail below with reference to the accompanying drawings.

Fifth, "a transmission path is congested or fails" in the embodiments of this application refers to one or more links on the transmission path are congested or fail.

It should be understood that names of all nodes, messages and parameters in the embodiments of this application are merely names specified for ease of description in this application, and may be different names in an actual network. It should not be understood that names of various nodes, messages and parameters are limited in this application. On the contrary, any name that has a same or similar function as that of a node, a message, or a parameter used in this application is considered as that in a method or an equivalent replacement in this application, and is within the protection scope of this application. Details are not described below. In addition, in the embodiments of this application, one message may include one or more pieces of information (or signaling).

In the embodiments of this application, a device configured to implement the methods or steps in the embodiments of this application may be a device itself, or may be an apparatus that can implement the methods or steps in the embodiments of this application, such as a chip or a processor disposed in the device. This is not limited in the embodiments of this application. For example, the device may be a donor base station, a first IAB node, a second IAB node, a child node of the first IAB node, or a parent node of the first IAB node described below. The terminal device described below may be the terminal device itself, or may be a chip or a processor disposed in the terminal device. For ease of description, the terminal device is used for uniform description.

The following describes in detail the embodiments of this application by using interaction between the first IAB node, the second IAB node, and the donor base station as an example.

Figure 4:
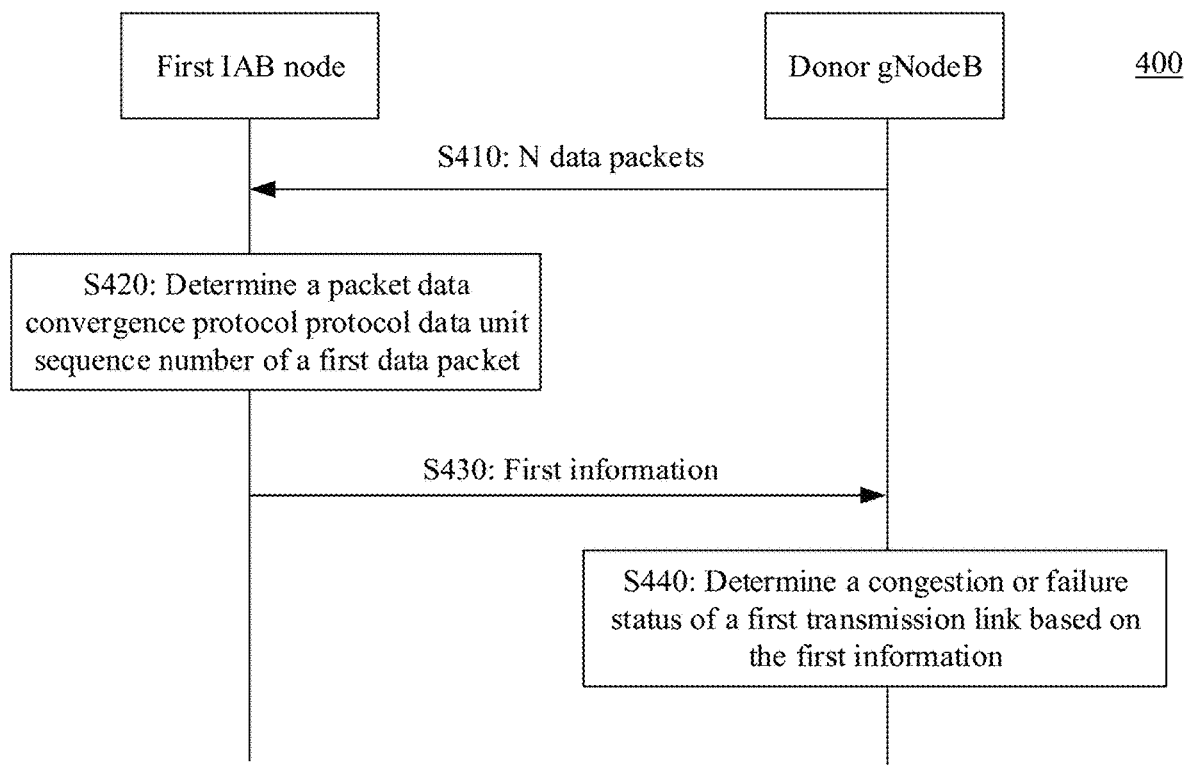
FIG. 4 is a schematic flowchart of a data transmission method 400 according to an embodiment of this application.

FIG. 4 is a schematic flowchart of a data transmission method 400 according to an embodiment of this application. The method 400 is applied to a communication system including a donor base station and a first IAB node, where the first IAB node is an access node of a terminal device. As shown in FIG. 4, the method 400 may include step S410 to step S440. The following describes in detail the steps in the method 400.

Step S410: The first IAB node receives N data packets sent by the donor base station to the terminal device, where N is a positive integer, and N is greater than 1.

That the first IAB node receives N data packets sent by the donor base station to the terminal device may be understood as that the first IAB node successfully receives the N data packets sent by the donor base station to the terminal device, or that the first IAB node receives N data packets sent by the donor base station to the terminal device may be understood as that the first IAB node can correctly read a value of a PDCP PDU SN of each of the received N data packets sent by the donor base station to the terminal device.

Optionally, in an RLC acknowledged mode (AM), the first IAB node receives the N data packets sent by the donor base station to the terminal device.

Optionally, in the RLC AM, S data packets in the N data packets may be retransmitted data packets, and P data packets in the N data packets may be newly transmitted data packets, where S and P are positive integers, and a sum of S and P is N. For example, the first IAB node receives six data packets sent by the donor base station to the terminal device. In the six data packets, two data packets may be retransmitted data packets, and four data packets may be newly transmitted data packets. Alternatively, all of the six data packets may be retransmitted data packets. Alternatively, all of the six data packets may be newly transmitted data packets.

Optionally, in an RLC unacknowledged mode (UM), the first IAB node receives the N data packets sent by the donor base station to the terminal device.

Optionally, the first IAB node may receive, from a second IAB node, the N data packets sent by the donor base station to the terminal device. The second IAB node is a parent node of the first IAB node, that is, the first IAB node communicates with the donor base station via the second IAB node. Alternatively, the first IAB node may receive, from a mobile terminal (MT) side of the first IAB node, the N data packets sent by the donor base station to the terminal device. Alternatively, the first IAB node may receive the sent N data packets from a higher layer of a DU of the first IAB node, where the higher layer of the DU may be an upper protocol layer of a PDCP layer.

Step S420: The first IAB node determines a PDCP SN of a first data packet in PDCP PDU SNs of the N data packets, where the PDCP PDU SN of the first data packet is a largest PDCP PDU SN in the PDCP PDU SNs of the N data packets, or the PDCP PDU SN of the first data packet is a largest PDCP SN in consecutive PDCP PDU SNs starting from a smallest PDCP PDU SN in the PDCP PDU SNs that are of the N data packets and that are arranged in ascending order.

For example, in the RLC AM mode, the first IAB node receives four data packets sent by the donor base station to the terminal device, and PDCP PDU SNs corresponding to the four data packets sequentially received by the first IAB node may be 1, 2, 6, and 3. In this case, the first IAB node may determine that the PDCP PDU SN of the first data packet is a largest PDCP PDU SN in the four data packets, that is, the PDCP PDU SN of the first data packet is 6. For another example, in the RLC AM mode, the first IAB node sequentially receives five data packets sent by the donor base station to the terminal device, the five data packets are arranged in ascending order of PDCP PDU SN, and PDCP PDU SNs may be 1, 2, 4, 6, and 7 in sequence. The first IAB node may determine that the PDCP PDU SN of the first data packet is a largest PDCP PDU SN in consecutive PDCP PDU SNs starting from a smallest PDCP PDU SN in the PDCP PDU SNs that are of the five data packets and that are arranged in ascending order. In this case, the PDCP PDU SN of the first data packet is 2.

Optionally, in the RLC AM mode, the PDCP PDU SN of the first data packet may alternatively be a largest PDCP PDU SN in PDCP PDU SNs of retransmitted data packets in the N data packets, or the PDCP PDU SN of the first data packet may alternatively be a largest PDCP PDU SN in the first group of data packets with consecutive PDCP PDU SNs in PDCP PDU SNs that are of retransmitted data packets in the N data packets received by the first IAB node and that are arranged in ascending order of PDCP PDU SN. For example, in the RLC AM mode, the first IAB node receives four data packets sent by the donor base station to the terminal device, and PDCP PDU SNs corresponding to the four data packets received by the first IAB node may be 1, 2, 6, and 3. If data packets with PDCP PDU SNs 1 and 3 are retransmitted data packets, the first IAB node may determine that the PDCP PDU SN of the first data packet is a largest PDCP PDU SN in the PDCP PDU SNs of the retransmitted data packets (whose PDCP PDU SNs are 1 and 3) in the four data packets, that is, the PDCP PDU SN of the first data packet is 3. For another example, in the RLC AM mode, the first IAB node receives six data packets sent by the donor base station to the terminal device. The six data packets are arranged in ascending order of PDCP PDU SN, and PDCP PDU SNs may be 1, 2, 4, 5, 7, and 8 in sequence, and data packets with PDCP PDU SNs 4, 5, 7, and 8 in the six data packets are retransmitted data packets. In this case, the first IAB node may determine that the PDCP PDU SN of the first data packet is a largest PDCP PDU SN in consecutive PDCP PDU SNs starting from a smallest PDCP PDU SN in the PDCP PDU SNs of the retransmitted data packets (whose PDCP PDU SNs are 4, 5, 7, and 8) that are in the six data packets and that are arranged in ascending order. In this case, the PDCP PDU SN of the first data packet is 5.

For example, in the RLC UM mode, the first IAB node receives five data packets sent by the donor base station to the terminal device, and PDCP PDU SNs corresponding to the five data packets sequentially received by the first IAB node may be 1, 5, 4, 6, and 2. In this case, the first IAB node may determine that the PDCP PDU SN of the first data packet is a largest PDCP PDU SN in the PDCP PDU SNs of the five data packets, that is, the PDCP PDU SN of the first data packet is 6. For another example, in the RLC UM mode, the first IAB node receives seven data packets sent by the donor base station to the terminal device, and PDCP PDU SNs corresponding to the seven data packets sequentially received by the first IAB node are 1, 5, 4, 6, and 7, In this case, the first IAB node may determine that the PDCP PDU SN of the first data packet is a largest PDCP PDU SN in consecutive PDCP PDU SNs starting from a smallest PDCP PDU SN in the PDCP PDIJ SNs of the seven data packets that are arranged in ascending order. In this case, the PDCP PDU SN of the first data packet is 1.

Step S430: The first IAB node sends first information to the donor base station, where the first information includes a value of the PDCP PDU SN of the first data packet.

Optionally, the first information may be included in a user plane message on an F1 interface between the first IAB node and the donor base station. The user plane message on the F1 interface is at a peer F1 protocol layer between the first IAB node and the donor base station.

Optionally, the user plane message on the F1 interface further includes a first identifier, and the first identifier is used to indicate whether the user plane message on the F1 interface includes the first information.

Optionally, the first identifier may occupy 1 bit.

The user plane message on the F1 interface includes the first identifier and the first information, so that a receive end can correctly obtain a length of the user plane message on the F1 interface through interpretation, and the donor base station can determine whether the user plane message on the F1 interface includes the first information.

Optionally, the user plane message on the F1 interface may be a DDDS feedback message. The DDDS feedback message may further include at least one of the following: a maximum PDCP PDU SN successfully sent by the first IAB node to the terminal device in ascending order in the RLC AM; a maximum PDCP PDU SN sent by the first IAB node to a bottom layer in the RLC UM; a buffer size expected by a DRB for data transmission between the terminal device and the first IAB node; or a data transmission rate expected by a DRB for data transmission between the terminal device and the first IAB node.

Step S440: The donor base station determines a congestion or failure status of a first transmission path based on the first information, where the first transmission path is a backhaul link between the first IAB node and the donor base station.

Figure 5:
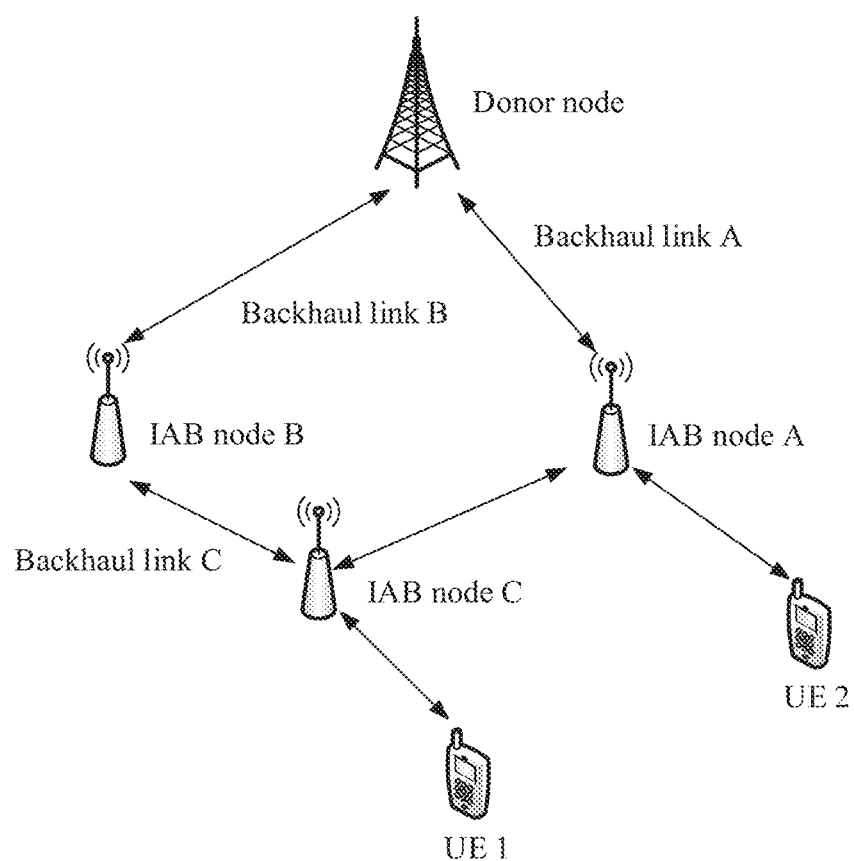
FIG. 5 is another schematic structural diagram of an IAB node.

Optionally, when the first IAB node is directly connected to the donor base station, the first transmission path is the backhaul link between the first IAB node and the donor node. For example, as shown in FIG. 5, a communication path between the donor base station and UE 2 may be a path A: the donor base station↔an IAB node A↔the UE 2, where the first IAB node is the IAB node A, and the IAB node A directly communicates with the donor base station. The first transmission path is a backhaul link between the IAB node A and the donor base station, that is, the first transmission path may be a backhaul link A.

Optionally, the communication system may further include one or more second IAB nodes. The first transmission path is described in detail below by using two cases as examples. This application is not limited to the following two cases:

Case 1: The first IAB node communicates with the donor base station via the second IAB node.

The first transmission path is a backhaul link between the first IAB node and the second IAB node and/or a backhaul link between the second IAB node and the donor base station, where the second IAT3 node is the parent node of the first IAB node, and the donor base station is a parent node of the second IAB node. For example, as shown in FIG. 5, in the communication system, a communication path between the donor base station and UE 1 may be a path B, and the path B is the donor base station↔an AB node B↔an IAB node C↔the UE 1, where the first IAB node is the IAB node C, the second IAB node is the IAB node B, the IAB node B is a parent node of the IAB node C, and the donor base station is a parent node of the IAB node B. The first transmission path is a backhaul link between the IAB node C and the AB node B and/or a backhaul link between the IAB node B and the donor base station, that is, the first transmission path is a backhaul link B and/or a backhaul link C.

Case 2: The first IAB node sequentially communicates with the donor base station via a second IAB node #A and the second IAB node.

Figure 7:
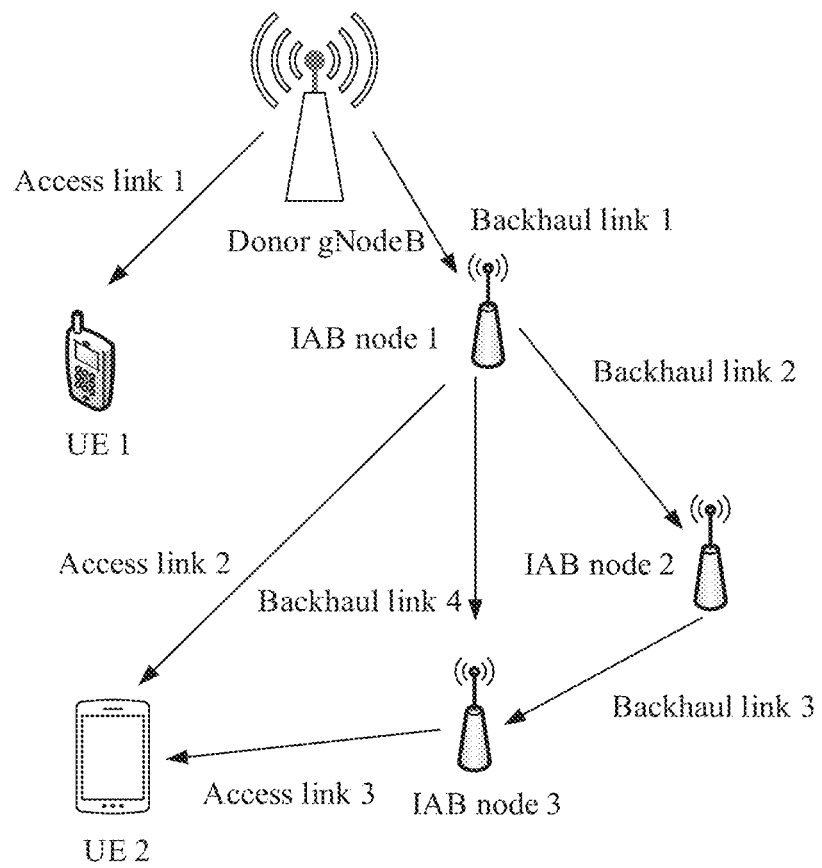
FIG. 7 is still another schematic structural diagram of an IAB node.

The first transmission path may be a backhaul link between the first IAB node and the second IAB node #A, a backhaul link between the second IAB node #A and the second IAB node #B, and/or a backhaul link between the second IAB node #B and the donor base station. The second IAB node #A is a parent node of the first IAB node, the second IAB node #B is a parent node of the first IAB node, and the donor base station is a parent node of the second IAB node #B. For example, as shown in FIG. 7, in the communication system, a communication path between the donor base station and UE 1 may be a path 2, and the path 2 is: the donor base station↔an IAB node 1↔an IAB node 2↔an IAB node 3↔UE 2. The first IAB node is the IAB node 3, the second IAB node #A is the IAB node 2, the second IAB node #B is the IAB node 1, the IAB node 3 sequentially communicates with the donor base station via the IAB node 2 and the IAB node 1, the IAB node 2 is a parent node of the IAB node 3, the IAB node 1 is a parent node of the IAB node 2, and the donor base station is a parent node of the IAB node 1. The first transmission path is a backhaul link between the IAB node 3 and the IAB node 2, a backhaul link between the IAB node 2 and the IAB node 1, and/or a backhaul link between the IAB node 1 and the donor base station, that is, the first transmission path is a backhaul link 3, a backhaul link 2, and/or a backhaul link 1.

Optionally, the donor base station determines, based on the value of the PDCP PDU SN of the first data packet and a value of a PDCP PDU SN of a second data packet that is sent by the donor base station, whether the first transmission path is congested or fails, where the PDCP PDIJ SN of the second data packet is a largest PDCP PDU SN in PDCP PDU J SNs of L data packets already sent by the donor base station, where L≥N, and L is a positive integer.

Optionally, the donor base station may determine, depending on whether a difference between the value of the PDCP PDU SN of the first data packet and the value of the PDCP PDU SN of the second data packet that is sent by the donor base station exceeds a preset value, whether the first transmission path is congested or fails. When the difference between the value of the PDCP PDU SN of the first data packet and the value of the PDCP PDU SN of the second data packet that is sent by the donor base station exceeds the preset value, the donor base station determines that the first transmission path is congested or fails. The preset value may be determined based on the quantity L of data packets sent by the donor base station. For example, when the quantity of data packets sent by the donor base station is 100, the preset value may be 80. For example, if the value of the SN of the first data packet is 5, and the value of the SN of the second data packet is 100, the donor base station may determine that the first transmission path is congested or fails. For another example, if the value of the SN of the first data packet is 85, and the value of the SN of the second data packet is 100, the donor base station may determine that the first transmission path is not congested.

If the donor base station determines that the first transmission path is congested, the donor base station may reduce a transmission rate of data that is sent to the terminal device through the first transmission path, or the donor base station changes a routing path of the data sent to the terminal device (that is, changes the first transmission path), so that data between the donor base station and the terminal device is not transmitted through the first transmission path.

For example, as shown in FIG. 5, in the communication system, a communication path between the donor base station and UE 1 may be a path B, and the path B is the donor base station↔an IAB node B↔an IAB node C↔the UE 1, where the first IAB node is the IAB node C, the second IAB node is the IAB node B, the IAB node B is a parent node of the IAB node C, and the donor base station is a parent node of the IAB node B. The first transmission path is a backhaul link between the IAB B node C and the IAB node B and/or a backhaul link between the IAB node B and the donor base station, that is, the first transmission path is a backhaul link B and/or a backhaul link C. When the first transmission path is congested or fails, the donor base station may change the first transmission path, that is, the donor base station replaces the first transmission path with another transmission path between the donor base station and the UE 1. For example, a communication path between the donor base station and the UE 1 may alternatively be a path C, and the path C is: the donor base station↔the IAB node A↔the IAB node C↔the UE 1. The donor base station sends data sent to the UE 1 through the path 2 instead of sending the data to the UE 1 through the path 1. Alternatively, when the first transmission path fails, the donor base station may reduce a transmission rate of data sent by the donor base station to the UE 1 through the first transmission path.

The donor base station changes a path for a congested link on the first transmission path or reduces the transmission rate of the data sent to the terminal device through the first transmission path, thereby avoiding or alleviating congestion on the first transmission path, and improving data transmission performance.

Figure 6:
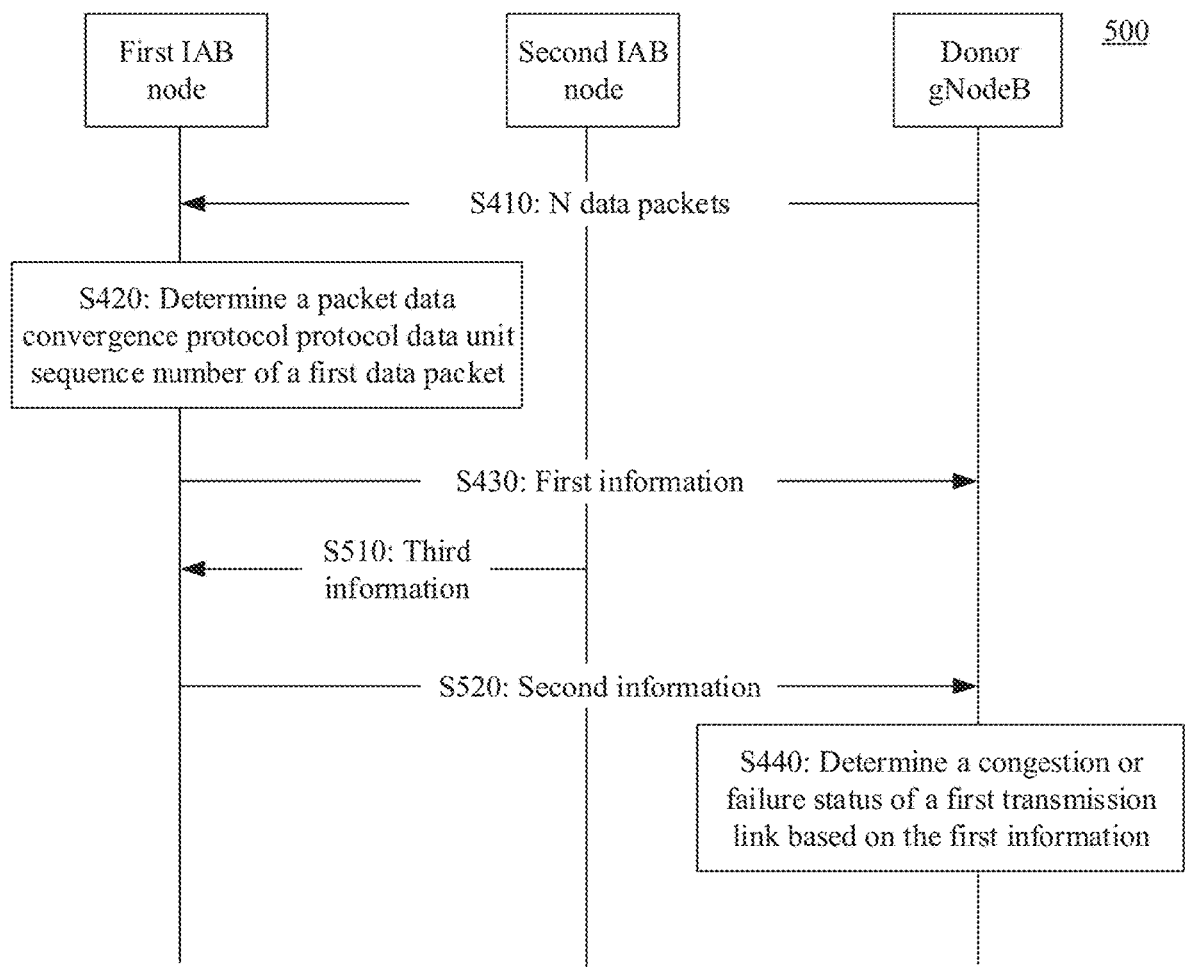
FIG. 6 is a schematic flowchart of another data transmission method 500 according to an embodiment of this application.

Further, this application further provides another data transmission method. As shown in FIG. 6, the method 500 is applied to a communication system including a donor base station and a first IAB node, and the first IAB node is an access node of a terminal device. The method 500 includes step S410 to step S440, step S510, and step S520, as shown in FIG. 6. The following describes the steps in detail.

For step S410 to step S430, refer to descriptions in the method 400. Details are not described herein again.

When one or more second IAB nodes exist between the first IAB node and the donor base station, step S510 is performed.

Optionally, in step S510, the first IAB node receives third information from the second IAB node, where the third information is used to indicate whether a backhaul link between the second IAB node and the donor base station is congested or fails.

The first IAB node communicates with the donor base station via the second IAB node.

Optionally, the first IAB node may communicate with the donor base station via one or more second IAB nodes. When the first IAB node communicates with the donor base station via a plurality of second IAB nodes, a current second IAB node needs to send, to a next second IAB node level by level, a status of whether a backhaul link between the current second IAB node and a parent node of the current second IAB node is congested or fails.

The case 1 and the case 2 described in step S440 are used as examples for detailed description below.

Case 1: The first IAB node communicates with the donor base station via one second IAB node.

The third information is used to indicate whether the backhaul link between the second IAB node and the donor base station is congested or fails.

The third information may indicate, in the following two manners, whether the backhaul link between the second IAB node and the donor base station is congested or fails. This application is not limited to the following two manners.

Manner 1: The third information may indicate, by using an identifier, that the backhaul link between the second IAB node and the donor base station is congested or fails. To be specific, if the third information includes an identifier of a link, it indicates that the link is congested or fails. If the third information does not include an identifier of a link, it indicates that the link is not congested or does not fail. If the third information carries an identifier of the backhaul link between the second IAB node and the donor base station, the backhaul link between the second IAB node and the donor base station is congested or fails.

Manner 2: The third information may indicate, by using a mapping table, whether the backhaul link between the second IAB node and the donor base station is congested or fails. The mapping table shows a one-to-one correspondence between the link and a status of whether the link is congested. The status of whether the link is congested is identified by using 0 and 1. For example, 0 may represent that the link is not congested or does not fail, and 1 may represent that the link is congested or fails. For example, if the backhaul link between the second IAB node and the donor base station corresponds to 1, the backhaul link between the second IAB node and the donor base station is congested or fails.

Case 2: The first IAB node communicates with the donor base station via two second IAB nodes, to be specific, the first IAB node communicates with the donor base station via the second IAB node #A and the second IAB node #B.

The third information is used to indicate whether the backhaul link between the second IAB node #A and the second IAB node #B is congested or fails, and/or whether the backhaul link between the second IAB node #B and the donor base station is congested or fails.

The second IAB node #B needs to send, to the second IAB node #A, a status of whether the backhaul link between the second IAB node #B and the donor base station is congested or fails. The second IAB node #A then sends, to the first IAB node, a status of whether the backhaul link between the second IAB node #A and the second IAB node #13 is congested or fails, and/or the status of whether the backhaul link between the second IAB node #B and the donor base station is congested or fails.

Further, the third information may indicate, in the following two manners, whether the backhaul link between the second IAB node #A and the second IAB node #B is congested or fails, and/or whether the backhaul link between the second IAB node #B and the donor base station is congested or fails.

Manner 1': The third information may indicate, by using an identifier, whether the backhaul link between the second IAB node #A and the second IAB node #B is congested or fails, and/or whether the backhaul link between the second IAB node #B and the donor base station is congested or fails. To be specific, if the third information includes an identifier of a link, it indicates that the link is congested or fails. If the third information does not include an identifier of a link, it indicates that the link is not congested or does not fail. For example, if the third information carries an identifier of the backhaul link between the second IAB node #A and the second IAB node #B, the backhaul link between the second IAB node #A and the second IAB node #B is congested or fails.

Manner 2': The third information may indicate, by using a mapping table, whether the backhaul link between the second IAB node #A and the second IAB node #B is congested or fails, and/or whether the backhaul link between the second IAB node #B and the donor base station is congested or fails. The mapping table shows a one-to-one correspondence between the link and a status of whether the link is congested. The status of whether the link is congested is identified by using 0 and 1. For example, 0 may represent that the link is not congested or does not fail, and 1 may represent that the link is congested or fails. For example, if the backhaul link between the second IAB node #A and the second IAB node #B corresponds to 0, the backhaul link between the second IAB node #A and the second IAB node is not congested or does not fail; if the backhaul link between the second IAB node #B3 and the donor base station corresponds to 1, the backhaul link between the second IAB node #B and the donor base station is congested or fails.

Step S520: The first IAB node sends second information to the donor base station, where the second information is used to indicate whether the first transmission path is congested or fails.

Optionally, the second information is included in the user plane message on the F1 interface between the first IAB node and the donor base station, and the user plane message on the F1 interface is at a peer F1 protocol layer between the first IAB node and the donor base station.

Optionally, the user plane message on the F1 interface further includes a second identifier, and the second identifier is used to indicate whether the user plane message on the F1 interface includes the second information.

Optionally, the second identifier may occupy 1 bit.

Optionally, the user plane message may be a DDDS feedback message.

Optionally, when the first IAB node is directly connected to the donor base station, the first transmission path is a backhaul link between the first IAB node and the donor node. The second information is used to indicate whether the backhaul link between the first IAB node and the donor node is congested or fails.

Optionally, the second information may indicate, by using an identifier, whether the backhaul link between the first IAB node and the donor node is congested or fails. To be specific, if the second information includes an identifier of the backhaul link between the first IAB node and the donor node, the backhaul link between the first IAB node and the donor node is congested or fails; or if the second information does not include an identifier of the backhaul link between the first IAB node and the donor node, the backhaul link between the first IAB node and the donor node is not congested or does not fail.

Optionally, the second information may alternatively indicate, by using a mapping table, whether the backhaul link between the first IAB node and the donor node is congested or fails. The mapping table shows a one-to-one correspondence between the backhaul link between the first IAB node and the donor node and a status of whether the backhaul link between the first IAB node and the donor node is congested or fails, where the status of whether the backhaul link between the first IAB node and the donor node is congested or fails is identified by using 0 or 1. For example, 0 may represent that the backhaul link between the first IAB node and the donor node is not congested or does not fail, and 1 may indicate that the backhaul link between the first IAB node and the donor node is congested or fails. For example, when the backhaul link between the first IAB node and the donor node corresponds to 1, the backhaul link between the first IAB node and the donor node is congested or fails.

Optionally, when the first IAB node communicates with the donor base station via one or more second IAB nodes, the first IAB node needs to combine the third information and a status of whether a backhaul link between the first IAB node and a parent node of the first IAB node is congested or fails, to form the second information, and send the second information to the donor base station.

Step S440: The donor base station determines a congestion or failure status of the first transmission path based on the first information.

Optionally, the donor base station determines the congestion or failure status of the first transmission path based on the first information and the second information. Specifically, the donor base station determines, based on the value of the PDCP PDU SN of the first data packet and a value of a PDCP PDU SN of a second data packet that is sent by the donor base station, whether the first transmission path is congested or fails, where the PDCP PDU SN of the second data packet is a largest PDGF PDU SN in PDCP PDU SNs of L data packets already sent by the donor base station, where L≥N, and L is a positive integer.

When the first transmission path is congested or fails, the donor base station determines a congested or failed link on the first transmission path depending on the status that is of whether the first transmission path is congested or fails and that is indicated in the second information. When there is a congested link on the first transmission path, the donor base station may reduce a transmission rate of data sent to the terminal device through the first transmission path. Alternatively, when there is a congested or failed link on the first transmission path, the donor base station changes a routing path of the data sent to the terminal device (that is, changing a path for the congested link on the first transmission path), so that data between the donor base station and the terminal device is not transmitted through the first transmission path.

For example, if a backhaul link between the first IAB node and the second IAB node is congested, the donor base station needs to change a path for the backhaul link between the first IAB node and the second IAB node. For example, as shown in FIG. 5, in the communication system, a communication path between the donor base station and UE 1 may be a path B, and the path B is: the donor base station↔an IAB node B↔an IAB node C↔the UE 1, where the first IAB node is the IAB node C, the second IAB node is the IAB node B, the IAB node B is a parent node of the IAB node C, and the donor base station is a parent node of the IAB node B. The first transmission path is a backhaul link between the IAB node C and the IAB node B and/or a backhaul link between the IAB node B and the donor base station, that is, the first transmission path is a backhaul link B and/or a backhaul link C. For another example, in the communication system, the communication path between the donor base station and the UE 1 may alternatively be a path C, and the path C is: the donor base station↔an IAB node A↔the IAB node C↔the UE 1, where the first IAB node is the IAB node C, the second IAB node is the IAB node A, the IAB node A is a parent node of the IAB node C, and the donor base station is a parent node of the IAB node A. The first transmission path is a backhaul link between the IAB node C and the IAB node A and/or a backhaul link between the IAB node A and the donor base station, that is, the first transmission path is a backhaul link B and/or a backhaul link A. If the second information indicates that the backhaul link between the donor base station and the IAB node A on the first transmission path is congested or fails, the donor base station may change the path between the donor base station and the IAB node A, so that the donor base station sends a data packet to the IAB node B instead of sending the data packet to the IAB node A, that is, the donor base station sends data to the terminal device through the path B instead of sending the data to the terminal device through the path C. If the second information indicates that the backhaul link between the donor base station and the IAB node A on the first transmission path is congested or fails, the donor base station reduces a transmission rate of data sent to the terminal device through the path between the donor base station and the IAB node A. For example, if the transmission rate of the data sent by the donor base station to the terminal device through the donor base station and the IAB node A is 1000 bit/s, the donor base station may set the transmission rate of the data sent to the terminal device through the donor base station and the IAB node A to 800 bit/s.

The donor base station changes a path for a congested or failed link on the first transmission path, or the donor base station reduces the transmission rate of the data sent to the terminal device through the congested link on the first transmission path, thereby avoiding or alleviating congestion on the first transmission path, and improving data transmission performance.

For detailed descriptions of step S440, refer to the descriptions of step S440 in the foregoing method 400. Details are not described herein again.

The donor base station may determine, by comparing the value of the PDCP PDU SN of the first data packet with the value of the PDCP PDU SN of the second data packet, whether the first transmission path is congested or fails. When the first transmission path is congested or fails, the donor base station determines, based on the second information, the congested or failed link on the first transmission path.

When determining that the first transmission path is congested, the donor base station may reduce a transmission rate of data sent to the terminal device through the first transmission path. Alternatively, when determining that the first transmission path is congested or fails, the donor base station changes a routing path of the data sent to the terminal device (that is, changing a path for the congested link on the first transmission path), so that data between the donor base station and the terminal device is not transmitted through the first transmission path.

The donor base station changes the path for the congested or failed link, to avoid or alleviate congestion on the first transmission path, and improve data transmission performance.

Figure 8:
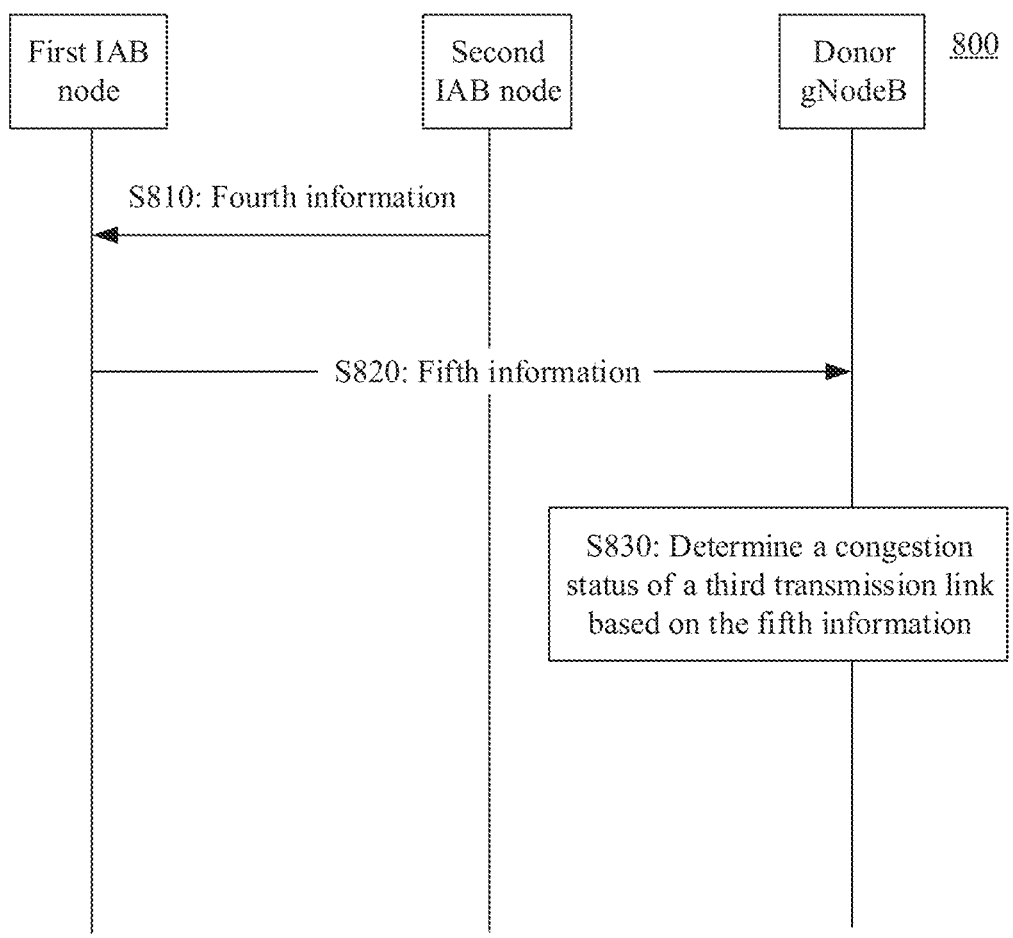
FIG. 8 is a schematic flowchart of still another data transmission method 800 according to an embodiment of this application.

FIG. 8 is a schematic flowchart of a data transmission method 800 according to another embodiment of this application from a perspective of interaction between nodes. The method 800 is applied to a communication system including a donor base station, a first IAB node, and a second IAB node, where the first IAB node is an access node of a terminal device, and the first IAB node communicates with the donor base station via the second IAB node. As shown in FIG. 8, the method 800 may include step S810 to step S830. The steps in the method are described in detail below.

Step S810: The first IAB node receives fourth information from the second IAB node, where the fourth information is used to indicate whether a second transmission path is congested or fails, and the second transmission path is a backhaul link between the second IAB node and the donor base station.

Optionally, the communication system may include one or more second IAB nodes, that is, the first IAB node communicates with the donor base station via the one or more second IAB nodes.

Cases in which there is one second IAB node and there are two second IAB nodes are used as examples for description below. A quantity of second IAB nodes is not limited in this application.

Case 1': The first IAB node communicates with the donor base station via one second IAB node.

The fourth information is used to indicate whether the backhaul link between the second IAB node and the donor base station is congested or fails.

The fourth information may indicate, in the following two manners, whether the backhaul link between the second IAB node and the donor base station is congested or fails. This application is not limited to the following two manners.

Manner A: The fourth information may indicate, by using an identifier, that the backhaul link between the second IAB node and the donor base station is congested or fails. To be specific, if the fourth information includes an identifier of a link, it indicates that the link is congested or fails. If the fourth information does not include an identifier of a link, it indicates that the link is not congested or does not fail. If the fourth information carries an identifier of the backhaul link between the second IAB node and the donor base station, the backhaul link between the second IAB node and the donor base station is congested or fails.

Manner B: The fourth information may indicate, by using a mapping table, whether the backhaul link between the second IAB node and the donor base station is congested or fails. The mapping table shows a one-to-one correspondence between the backhaul link between the second IAB node and the donor base station and a status of whether the backhaul link between the second IAB node and the donor base station is congested or fails, where the status of whether the backhaul link between the second IAB node and the donor base station is congested or fails is identified by using 0 or 1. For example, 0 may represent that the backhaul link between the second IAB node and the donor base station is not congested or does not fail, and 1 may indicate that the backhaul link between the second IAB node and the donor base station is congested or fails. For example, if the backhaul link between the second IAB node and the donor base station corresponds to 1, the backhaul link between the second IAB node and the donor base station is congested or fails.

Case 2': The first IAB node communicates with the donor base station via two second IAB nodes, to be specific, the first IAB node communicates with the donor base station via a second IAB node #A and a second IAB node #B.

The fourth information is used to indicate whether the backhaul link between the second IAB node #A and the second IAB node #B is congested or fails, and whether the backhaul link between the second IAB node #B and the donor base station is congested or fails.

The second IAB node #B needs to send, to the second IAB node #A, a status of whether the backhaul link between the second IAB node #B and the donor base station is congested or fails. The second IAB node #A then sends, to the first IAB node, a status of whether the backhaul link between the second IAB node #A and the second IAB node #B is congested or fails, and the status of whether the backhaul link between the second IAB node #B and the donor base station is congested or fails.

Further, the fourth information may indicate, in the following two manners, whether the backhaul link between the second IAB node #A and the second IAB node #B is congested or fails, and whether the backhaul link between the second IAB node #B and the donor base station is congested or fails.

Manner A': The fourth information may indicate, by using an identifier, whether the backhaul link between the second IAB node #A and the second IAB node #B is congested or fails, and whether the backhaul link between the second IAB node #B and the donor base station is congested or fails. To be specific, if the fourth information includes an identifier of a link, it indicates that the link is congested or fails. If the fourth information does not include an identifier of a link, it indicates that the link is not congested or does not fail. For example, if the fourth information carries an identifier of the backhaul link between the second IAB node #A and the second IAB node #B, the backhaul link between the second IAB node #A and the second IAB node #B is congested or fails.

Manner B': The fourth information may indicate, by using a mapping table, whether the backhaul link between the second IAB node #A and the second IAB node #B is congested or fails, and whether the backhaul link between the second IAB node #B and the donor base station is congested or fails. The mapping table shows a one-to-one correspondence between the link and a status of whether the link is congested. The status of whether the link is congested is identified by using 0 and 1. For example, 0 may represent that the link is not congested or does not fail, and 1 may represent that the link is congested or fails. For example, if the backhaul link between the second IAB node #A and the second IAB node #B corresponds to 0, the backhaul link between the second IAB node and the donor base station is not congested or does not fail; if the backhaul link between the second IAB node #B and the donor base station corresponds to 1, the backhaul link between the second IAB node #B and the donor base station is congested or fails.

Step S820: The first IAB node sends fifth information to the donor base station, where the fifth information is used to indicate whether a third transmission path is congested or fails, and the third transmission path includes a backhaul link between the first IAB node and the second IAB node and the second transmission path.

Optionally, the fifth information is included in a user plane message on an F1 interface between the first IAB node and the donor base station, and the user plane message on the F1 interface is at a peer F1 protocol layer between the first IAB node and the donor base station.

Optionally, the user plane message on the F1 interface further includes a third identifier, and the third identifier is used to indicate that the user plane message on the F1 interface includes the fifth information.

Optionally, the third identifier may occupy 1 bit.

Optionally, the user plane message may be a DDDS feedback message.

Optionally, the donor base station needs to combine the fourth information and a status of whether the backhaul link between the first IAB node and the second IAB node is congested or fails, to form the fifth information, and send the fifth information to the donor base station.

Optionally, the fifth information may indicate, by using an identifier, whether the third transmission path is congested or fails. To be specific, if the fifth information includes an identifier of a link, it indicates that the link is congested or fails; or if the fifth information does not include an identifier of a link, it indicates that the link is not congested or does not fail.

Optionally, the fifth information may alternatively indicate, by using a mapping table, whether the third transmission path is congested or fails. The mapping table shows a one-to-one correspondence between each link on the third transmission path and a status of whether each link on the third transmission path is congested or fails. Whether the link is congested or fails is identified by using 0 or 1. For example, 0 may indicate that the link is not congested or does not fail, and 1 may represent that the link is congested or fails. For example, if the backhaul link between the first IAB node and the second IAB node on the third transmission path corresponds to 1, the backhaul link between the first node and the second IAB node is congested or fails.

Step S830: The donor base station determines, a congested or failed link on the third transmission path based on the fifth information.

When there is a congested link on the third transmission path, the donor base station may reduce a transmission rate of data sent to the terminal device through the third transmission path. Alternatively, when there is a congested or failed link on the third transmission path, the donor base station changes a routing path of the data sent to the terminal device (that is, changing a path for the congested link on the third transmission path), so that data between the donor base station and the terminal device is not transmitted through the third transmission path.

For example, if the backhaul link between the first IAB node and the second IAB node is congested or fails, the donor base station needs to change a path for the backhaul link between the first IAB node and the second IAB node. For example, as shown in FIG. 7, a communication path between the donor base station and UE 2 may be a path 2 or a path 3. The path 2 is: the donor base station↔an IAB node 1↔an IAB node 2↔an IAB node 3↔the UE 2, and the path 3 is: the donor base station↔the IAB node 1↔the IAB node 3↔the UE 2. When the communication path between the donor base station and the UE 2 is the path 2, the IAB node 3 may be the first IAB node, the IAB node 2 may be the second IAB node #A, the IAB node 1 may be the second IAB node #B, and there are two second IAB nodes in the communication system. The third transmission path includes a backhaul link 1 between the donor base station and the IAB node 1, a backhaul link 2 between the IAB node 1 and the IAB node 2, and a backhaul link 3 between the IAB node 3 and the TATS node 2. When the communication path between the donor base station and the UE 2 is the path 3, the IAB node 3 may be the first IAB node, the IAB node 1 may be the second IAB node, and there is one second IAB node in the communication system. The third transmission path includes a backhaul link 1 between the donor base station and the IAB node 1 and a backhaul link 4 between the IAB node 3 and the IAB node 1. If the fifth information indicates that the backhaul link between the IAB node 1 and the IAB node 2 is congested or fails, the donor base station may change the path between the IAB node 1 and the IAB node 2, so that a data packet sent by the IAB node Ito the IAB node 2 is sent from the IAB node 1 to the IAB node 3. Alternatively, if the fifth information indicates that the backhaul link between the IAB node 1 and the IAB node 2 fails, the donor base station reduces a transmission rate of data sent to the terminal device through the path between the IAB node 1 and the IAB B node 2. For example, if the fifth information indicates that the backhaul link between the IAB node 1 and the IAB node 2 is congested, and in this case, a transmission rate of data sent by the donor base station to the terminal device through the backhaul link between the IAB node 1 and the IAB node 2 is 1200 bit/s, the donor base station may reduce, to 1000 bit/s, the transmission rate of the data sent to the terminal device through the backhaul link between the IAB node 1 and the IAB node 2.

The first IAB node directly connected to the terminal device sends, to the donor base station, the status of whether the backhaul link between the first IAB node and the second IAB node, the backhaul link between the second IAB node and the donor base station is congested or fails, or a status of whether backhaul links between a plurality of second IAB nodes are congested or fail, and the donor base station changes a path for a congested or failed link, to avoid or alleviate congestion on the backhaul link between the first IAB node and the second IAB node, the backhaul link between the second IAB node and the donor base station, or the backhaul links between the plurality of second IAB nodes, thereby improving data transmission performance.

Figure 9:
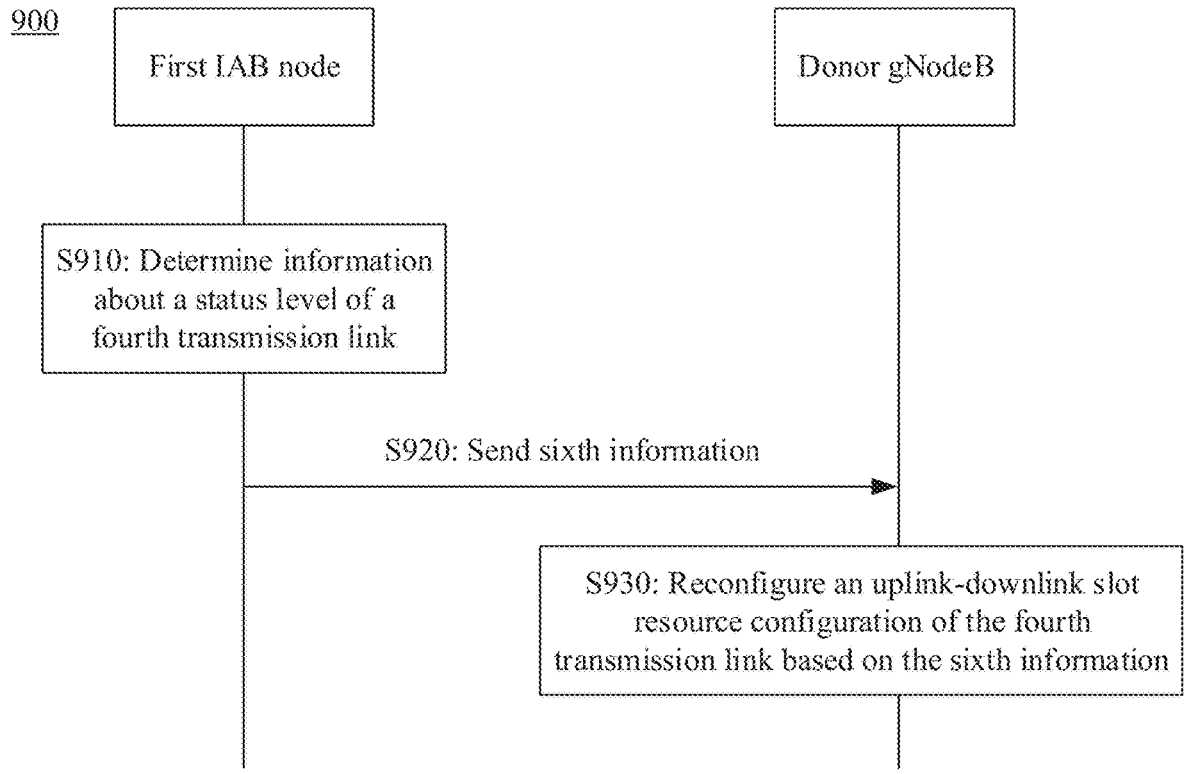
FIG. 9 is a schematic flowchart of still another data transmission method 900 according to an embodiment of this application.

FIG. 9 is a schematic flowchart of a data transmission method 900 according to another embodiment of this application from a perspective of interaction between nodes. The method 900 is applied to a communication system including a donor base station and a first IAB node. As shown in FIG. 9, the method 900 may include step S910 to step S930. The steps in the method are described in detail below.

Step S910: The first IAB node determines information about a status level of a fourth transmission path.

Optionally, the communication system may include one or more first IAB nodes, and each of the one or more first IAB nodes needs to determine the information about the status level of the fourth transmission path. Optionally, a quantity of nodes between the first IAB node and the donor base station is not limited in this application.

Optionally, the first IAB node may be an IAB node directly connected to a terminal device, or the first IAB node may not be an IAB node directly connected to the terminal device. A specific location of the first IAB node in the communication system is not limited in this application.

The status level of the fourth transmission path includes one of M status levels of the fourth transmission path, where M is greater than or equal to 2, M is a positive integer, and the M status levels of the fourth transmission path are defined based on buffer usage of the fourth transmission path. The fourth transmission path is a backhaul link between the first IAB node and a parent node of the first IAB node, and/or the fourth transmission path is a backhaul link between the first IAB node and a child node of the first IAB node. When the child node of the first IAB node is the terminal device, the fourth transmission path is an access link between the first IAB node and the terminal device.

For example, as shown in FIG. 7, a communication path between the donor base station and UE 2 may be a path 1 or a path 2, where the path 1 is: the donor base station↔an IAB node 1↔the LIE 2, and the path 2 is: the donor base station↔the IAB node 1↔an IAB node 2↔an IAB node 3↔the UE 2. When the communication path between the donor base station and the UE 2 is the path 1, the IAB node 1 may be the first IAB node, and there is only one first IAB node in the communication system. In this case, the donor base station is a parent node of the IAB node 1, and the terminal device is a child node of the IAB node 1; the fourth transmission path may be a backhaul link 1 between the donor base station and the IAB node 1, that is, the IAB node 1 needs to determine information about a status level of the backhaul link 1; or the fourth transmission path may be an access link 2 between the terminal device and the IAB node 1, that is, the IAB node 1 needs to determine information about a status level of the access link 2. When the communication path between the donor base station and the UE 2 is the path 2, the IAB node 3 may be the first IAB node. In addition, the communication system further includes two other first IAB nodes, that is, the IAB node 1 and the IAB node 2. The IAB node 3 is a parent node of the terminal device, the IAB node 2 is a parent node of the IAB node 3, the IAB node 2 is a child node of the IAB node 1, and the IAB node 1 is a child node of the donor base station. The fourth transmission path may be a backhaul link 1 between the donor base station and the IAB node 1, a backhaul link 2 between the IAB node 1 and the IAB node 2, a backhaul link 3 between the IAB node 2 and the IAB node 3, and/or an access link 3 between the IAB node 3 and the terminal device. In other words, the IAB node 1 needs to determine information about a status level of the backhaul link 1 or the IAB node 1 needs to determine information about a status level of the backhaul link 2, the IAB node 2 needs to determine a status level of the backhaul link 2 or the IAB node 2 needs to determine information about a status level of the backhaul link 3, and the IAB node 3 needs to determine information about a status level of the backhaul link 2 or the IAB node 3 mainly determines information about a status level of the access link 3.

Optionally, the M status levels may be specified in a communication protocol, or the M status levels may be configured by the donor base station:

Optionally, the status levels of the transmission path may be defined based on the buffer usage of the transmission path. For example, five status levels may be defined for the transmission path, and the five status levels of the transmission path may be separately shown in Table 1. A first status level corresponds to buffer usage of 0% to 20%, a second status level corresponds to buffer usage of 20% to 40%, a third status level corresponds to buffer usage of 40% to 60%, a fourth status level corresponds to buffer usage of 60% to 80%, and a fifth status level corresponds to buffer usage of 80% to 100%. For another example, four status levels may be defined for the transmission path, and the four status levels of the transmission path may be separately shown in Table 2. A first status level corresponds to buffer usage of 0% to 25%, a second status level corresponds to buffer usage of 25? to 50%, a third status level corresponds to buffer usage of 50% to 75%, and a fourth status level corresponds to buffer usage of 75% to 100%. Lower buffer usage indicates a higher status level of the transmission path, and indicates a severer congestion or failure status of the transmission path.

TABLE 1

| Status level of a transmission path | First status level | Second status level | Third status level | Fourth status level | Fifth status level |
|---|---|---|---|---|---|
| Buffer usage | 0%-20% | 20%-40% | 40%-60% | 60%-80% | 80%-100% |

TABLE 2

| Status level of a transmission path | First status level | Second status level | Third status level | Fourth status level |
|---|---|---|---|---|
| Buffer usage | 0%-25% | 25%-50% | 50%-75% | 75%-100% |

Optionally, the status levels of the transmission path may alternatively be defined based on load usage. For example, eight status levels may be defined for the transmission path, and the eight status levels of the transmission path may be separately shown in Table 3. A first status level corresponds to load usage of 0% to 12.5%, a second status level corresponds to load usage of 12.5 to 25%, a third status level corresponds to load usage of 25% to 37.5%, a fourth status level corresponds to load usage of 37.5% to 50%, a fifth status level corresponds to load usage of 50% to 62.5%, a sixth status level corresponds to load usage of 62.5% to 75%, a seventh status level corresponds to load usage of 75% to 87.5%, and an eighth status level corresponds to load usage of 87.5% to 100%. For another example, 10 status levels may be defined for the transmission path, and the 10 status levels of the transmission path may be separately shown in Table 4. A first status level corresponds to load usage of 0% to 10%, a second status level corresponds to load usage of 10% to 20%, a third status level corresponds to load usage of 20% to 30%, a fourth status level corresponds to load usage of 30% to 40%, a fifth status level corresponds to load usage of 40% to 50%, a sixth status level corresponds to load usage of 50% to 60%, a seventh status level corresponds to load usage of 60% to 70%, an eighth status level corresponds to load usage of 70% to 80%, a ninth status level corresponds to load usage of 80% to 90%, and a tenth status level corresponds to load usage of 90% to 100%. Higher load usage indicates a lower status level of the transmission path, and indicates a severer congestion or failure status of the transmission path.

TABLE 3

| Status level of a transmission path | Load usage |
| --- | --- |
| First status level | 0%-12.5% |
| Second status level | 12.5%-25% |
| Third status level | 25%-37.5% |
| Fourth status level | 37.5%-50% |
| Fifth status level | 50%-67.5% |
| Sixth status level | 62.5%-75% |
| Seventh status level | 75%-87.5% |
| Eighth status level | 87.5%-100% |

TABLE 4

| Status level of a transmission path | Load usage |
| --- | --- |
| First status level | 0%-10% |
| Second status level | 10%-20% |
| Third status level | 20%-30% |
| Fourth status level | 30%-40% |
| Fifth status level | 40%-50% |
| Sixth status level | 50%-60% |
| Seventh status level | 60%-70% |
| Eighth status level | 70%-80% |
| Ninth status level | 80%-90% |
| Tenth status level | 90%-100% |

Step S920: The first IAB node sends sixth information to the donor base station, where the sixth information is used to indicate the status level of the fourth transmission path.

Optionally, the sixth information is included in a donor base station distributed unit status indication (GNB-DU STATUS INDICATION) message. In this way, signaling overheads can be reduced.

Optionally, the sixth information may indicate the status level of the fourth transmission path by using a correspondence between an identifier 1 and an identifier 2. The identifier 1 may be an identifier of the fourth transmission path, and the identifier 2 may be an identifier of the status level of the fourth transmission path. For example, as shown in FIG. 7, when the communication path between the donor base station and the LE 2 is the path 1, where the path 1 is: the donor base station↔the IAB node 1↔the UE 2, the identifier 1 may be an identifier of the backhaul link 1, the identifier 2 indicates a status level of the backhaul link 1, and the identifier 1 and the identifier 2 are sent by the IAB node 1 to the donor base station; or the identifier 1 may be an identifier of the access link 2, the identifier 2 indicates a status level of the access link 2, and the identifier 1 and the identifier 2 are sent by the IAB node 1 to the donor base station. When the communication path between the donor base station and the UE 2 is the path 2, where the path 2 is: the donor base station↔the IAB node 1↔the IAB node 2↔the IAB node 3↔the UE 2, the identifier 1 may be an identifier corresponding to the backhaul link 1, the identifier 2 may indicate a status level of the backhaul link 1, and the identifier 1 and the identifier 2 are sent by the IAB node 1 to the donor base station; the identifier 1 may be an identifier corresponding to the backhaul link 2, the identifier 2 may indicate a status level of the backhaul link 2, and the identifier 1 and the identifier 2 are sent by the IAB node 2 or the IAB node 1 to the donor base station; the identifier 1 may be an identifier corresponding to the backhaul link 3, the identifier 2 may indicate a status level of the backhaul link 3, and the identifier 1 and the identifier 2 are sent by the IAB node 3 or the IAB node 2 to the donor base station; or the identifier 1 may be an identifier corresponding to the access link 3, the identifier 2 may indicate a status level of the access link 3, and the identifier 1 and the identifier 2 are sent by the IAB node 3 to the donor base station.

Step S930: The donor base station reconfigures an uplink-downlink slot resource configuration of the fourth transmission path based on the sixth information.

Specifically, the donor base station determines the status level of the fourth transmission path based on the sixth information, and reconfigures an uplink-downlink slot resource configuration of a congested or failed link based on the status level of the fourth transmission path. The donor base station may reconfigure the uplink-downlink slot resource configuration of the congested or failed link based on a previous uplink-downlink slot resource configuration of the congested or failed link.

The donor base station may learn of the buffer usage of the fourth transmission path based on the status level of the fourth transmission path, and the donor base station reconfigures the uplink-downlink slot resource configuration of the fourth transmission path based on the buffer usage of the fourth transmission path. Therefore, the donor base station may properly allocate uplink and downlink slot resources on the fourth transmission path based on current buffer usage of the fourth transmission path, thereby improving data transmission performance.

For example, as shown in FIG. 7, a communication path between the donor base station and UE 2 may be a path 1 or a path 2, where the path 1 is: the donor base station an↔IAB node 1↔the UE 2, and the path 2 is: the donor base station↔the IAB node 1↔an IAB node 2↔an IAB node 3↔the UE 2.

When the communication path between the donor base station and the UE 2 is the path 1, the sixth information is used to indicate the status level of the backhaul link 1, and the sixth information includes the identifier of the backhaul link 1 and the status level of the backhaul link 1. The donor base station reconfigures an uplink-downlink slot resource configuration of the backhaul link 1 based on the status level of the backhaul link 1 and a previous uplink-downlink slot resource configuration of the backhaul link 1. For example, if the status level of the backhaul link 1 corresponds to the buffer usage of 0% to 20%, the donor base station may reduce the uplink-downlink slot resource configuration of the backhaul link 1 based on the previous uplink-downlink slot resource configuration of the backhaul link 1. For another example, if the status level of the backhaul link 1 corresponds to the buffer usage of 80% to 100%, the donor base station may increase the uplink-downlink slot resource configuration of the backhaul link 1 based on the previous uplink-downlink slot resource configuration of the backhaul link 1. Alternatively, the sixth information is used to indicate is the status level of the access link 3, and the sixth information includes an identifier of the access link 3 and the status level of the access link 3. The donor base station reconfigures an uplink-downlink slot resource configuration of the access link 3 based on the status level of the access link 3 and a previous uplink-downlink slot resource configuration of the access link 3. For example, if the status level of the access link 3 corresponds to the buffer usage of 20% to 40%, the donor base station may reduce the uplink-downlink slot resource configuration of the access link 3 based on the previous uplink-downlink slot resource configuration of the access link 3. For another example, if the status level of the access link 3 corresponds to the buffer usage of 80% to 100%, the donor base station may increase the uplink-downlink slot resource configuration of the access link 3 based on the previous uplink-downlink slot resource configuration of the access link 3.

When the communication path between the donor base station and the UE 2 is the path 2, three first IAB nodes in the communication system all need to send the sixth information to the donor base station. Specifically, the IAB node 1 sends the sixth information to the donor base station, where the sixth information is used to indicate the status level of the backhaul link 1 and the sixth information includes the identifier of the backhaul link 1 and the status level of the backhaul link 1, or the sixth information is used to indicate the status level of the backhaul link 2 and the sixth information includes the identifier of the backhaul link 2 and the status level of the backhaul link 2; the IAB node 2 sends the sixth information to the donor base station, where the sixth information is used to indicate the status level of the backhaul link 2 and the sixth information includes the identifier of the backhaul link 2 and the status level of the backhaul link 2, or the sixth information is used to indicate the status level of the backhaul link 3 and the sixth information includes the identifier of the backhaul link 3 and the status level of the backhaul link 3; and/or the IAB node 3 sends the sixth information to the donor base station, where the sixth information is used to indicate the status level of the backhaul link 3 and the sixth information includes the identifier of the backhaul link 3 and the status level of the backhaul link 3, or the sixth information is used to indicate the status level of the access link 3 and the sixth information includes the identifier of the access link 3 and the status level of the access link 3. The donor base station needs to reconfigure an uplink-downlink slot resource configuration of the backhaul link 1 based on the status level of the backhaul link 1 and a previous uplink-downlink slot resource configuration of the backhaul link 1. The donor base station may further need to reconfigure an uplink-downlink slot resource configuration of the backhaul link 2 based on the status level of the backhaul link 2 and a previous uplink-downlink slot resource configuration of the backhaul link 2. The donor base station may further need to reconfigure an uplink-downlink slot resource configuration of the backhaul link 3 based on the status level of the backhaul link 3 and a previous uplink-downlink slot resource configuration of the backhaul link 3. The donor base station may further need to reconfigure an uplink-downlink slot resource configuration of the access link 3 based on the status level of the access link 3 and a previous uplink-downlink slot resource configuration of the access link 3. For example, if the status level of the backhaul link 1 corresponds to the load usage of 0% to 10%, the donor base station may reduce the uplink-downlink slot resource configuration of the backhaul link 1 based on the previous uplink-downlink slot resource configuration of the backhaul link 1. If the status level of the backhaul link 2 corresponds to the load usage of 40% to 50%, the donor base station may not change the uplink-downlink slot resource configuration of the backhaul link 1 based on the previous uplink-downlink slot resource configuration of the backhaul link 2. If the status level of the backhaul link 3 corresponds to the load usage of 80% to 90%, the donor base station may reduce the uplink-downlink slot resource configuration of the backhaul link 3 based on the previous uplink-downlink slot resource configuration of the backhaul link 3. If the status level of the access link 3 corresponds to the load usage of 10% to 20%, the donor base station may increase the uplink-downlink slot resource configuration of the access link 3 based on the previous uplink-downlink slot resource configuration of the access link 3.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

Figure 10:
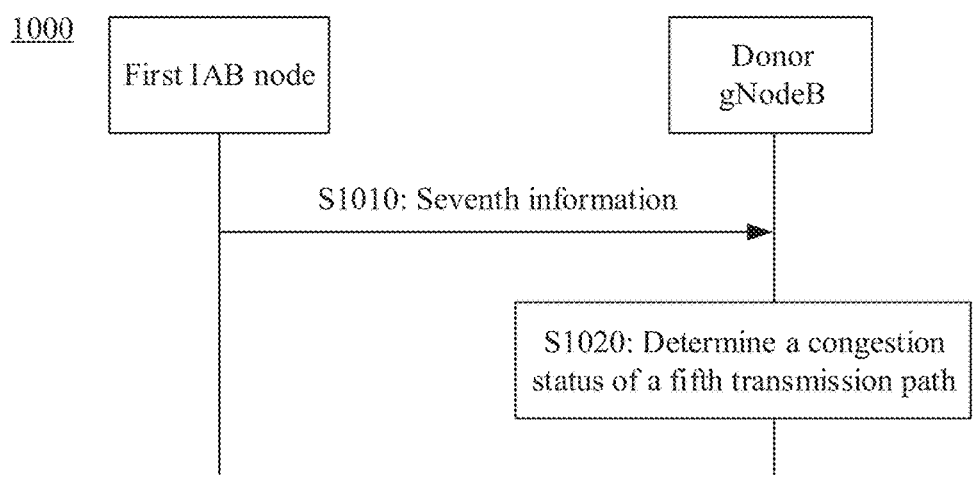
FIG. 10 is a schematic flowchart of a transmission path congestion determining method 1000 according to an embodiment of this application.

FIG. 10 is a schematic flowchart of a transmission path congestion determining method 1000 according to an embodiment of this application from a perspective of interaction between nodes. The method 1000 is applied to a communication system including a donor base station and a first IAB node. As shown in FIG. 10, the method 1000 may include step S1010 and step S1020, The steps in the method are described in detail below.

Step S1010: The first IAB node sends seventh information to the donor base station, where the seventh information includes a value of a PDCP PDU SN of a third data packet and a buffer size expected by a terminal device (e.g. UE) DRB, and the PDCP PDU SN of the third data packet is a largest PDCP PDU SN in PDCP PDU SNs of R data packets successfully sent by the first IAB node to a terminal device in sequence or a largest PDCP PDU SN in PDCP SNs of R data packets sent by the first IAB node to the terminal device, where R is greater than 1, and R is a positive integer.

Optionally, the seventh information is included in a user plane message on an F1 interface between the first IAB node and the donor base station.

Optionally, the user plane message on the F1 interface further includes a fourth identifier, and the fourth identifier is used to indicate that the user plane message on the F1 interface includes the seventh information.

The user plane message on the F1 interface includes the fourth identifier and the seventh information, so that a receive end can correctly obtain a length of the user plane message on the F1 interface through interpretation, and the donor base station can determine whether the user plane message on the F1 interface includes the seventh information.

Step S1020: The donor base station determines a congestion status of a fifth transmission path based on the seventh information, where the fifth transmission path includes a transmission path between the first IAB node and the donor base station and/or an access link between the first IAB node and the terminal device.

The transmission path between the first IAB node and the donor base station includes one or more backhaul links. When the first IAB node directly communicates with the donor base station, the transmission path between the first IAB node and the donor base station is a backhaul link between the first IAB node and the donor base station. When the first IAB node communicates with the donor base station via one or more second IAB nodes, the transmission path between the first IAB node and the donor base station is a backhaul link between the first IAB node and the second IAB node, a backhaul link between the second IAB node and the donor base station, and/or backhaul links between the second IAB nodes.

When a difference between the value of the PDCP PDU SN of the third data packet and a value of a PDCP PDU SN of a fourth data packet is greater than or equal to a first threshold, the donor base station determines that the fifth transmission path is congested, where the value of the PDCP PDU SN of the fourth data packet is a largest PDCP PDU SN in PDCP PDU SNs of K data packets sent by the donor base station to the terminal device, K is greater than 1, and K is a positive integer.

For example, when a quantity of data packets sent by the donor base station is 120, the first threshold may be 80. For example, if the value of the SN of the third data packet is 15, and the value of the SN of the fourth data packet is 120, the donor base station may determine that the fifth transmission path is congested or fails. For another example, if the value of the SN of the third data packet is 85, and the value of the SN of the fourth data packet is 120, the donor base station may determine that the first transmission path is not congested.

When the fifth transmission path is congested, the donor base station determines whether the buffer size expected by the UE DRB is greater than or equal to a second threshold.

When the buffer size expected by the UE DRB is greater than or equal to the second threshold, the donor base station may determine that a first backhaul link on the transmission path between the first IAB node and the donor base station is congested, where the first backhaul link is any backhaul link on the transmission path between the first IAB node and the donor base station. When the buffer size expected by the UE DRB is less than the second threshold, the donor base station determines that the access link between the first IAB node and the terminal device is congested. Alternatively, when the buffer size expected by the UE DRB is greater than the second threshold, the donor base station may determine that a first backhaul link on the transmission path between the first IAB node and the donor base station is congested, where the first backhaul link is any backhaul link on the transmission path between the first IAB node and the donor base station. When the buffer size expected by the UE DRB is less than or equal to the second threshold, the donor base station determines that the access link between the first IAB node and the terminal device is congested.

Optionally, the first threshold is specified in a communication protocol, or the first threshold is configured by the donor base station.

Optionally, the second threshold is specified in a communication protocol, or the second threshold is configured by the donor base station.

Figure 11:
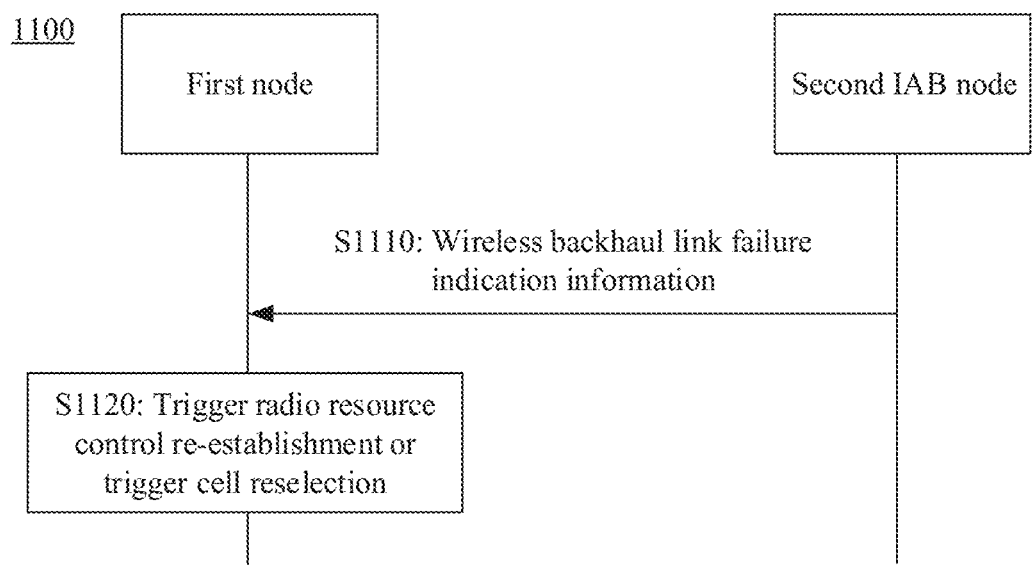
FIG. 11 is a schematic flowchart of a wireless backhaul link failure indication method 1100 according to an embodiment of this application.

FIG. 11 is a schematic flowchart of a wireless backhaul link failure indication method 1100 according to an embodiment of this application from a perspective of interaction between nodes. As shown in FIG. 11, the method 1100 may include step S1110 and step S1120. The steps in the method are described in detail below.

Step S1110: A second IAB node sends wireless backhaul link failure indication information to a first node, where the wireless backhaul link failure indication information is used to indicate that a wireless backhaul link between the second IAB node and a parent node of the second IAB node fails or RRC re-establishment fails, where the first node is a first IAB node or a terminal device.

The second IAB node is a parent node of the first IAB node, and the terminal device is a terminal device served by the second IAB node.

Optionally, the wireless backhaul link failure indication information may be carried in a downlink control message (DCI) sent by the second IAB node, and a cyclic redundancy check (CRC) of the DCI may be a paging radio network temporary identifier (P-RNTI). Specifically, 1 bit may be added to reserved bits in a short message in the DCI to indicate a wireless backhaul link failure. For example, for the 1 bit, 1 indicates that the wireless backhaul link fails, and 0 indicates that the wireless backhaul link does not fail; or for the 1 bit, 0 indicates that the wireless backhaul link fails, and 1 indicates that the wireless backhaul link does not fail.

Optionally, the wireless backhaul link failure indication may be alternatively carried in a broadcast message sent by the second IAB node, and specifically may be carried in signaling or a channel sent by the second IAB node, such as a master information block (MIB) message, system information (SIB), or a physical broadcast channel (PBCH), where the SIB message includes a series of SIB messages such as a SIB1 and a SIB2.

Optionally, the DCI for scheduling a paging message includes a fifth identifier, and the fifth identifier is used to trigger the first IAB node to immediately read the broadcast message, to reduce a delay in waiting to read the broadcast message by the first IAB node.

Step S1120: The first node triggers RRC re-establishment or cell reselection based on the wireless backhaul link failure indication information.

That the first node performs a first operation based on the wireless backhaul link failure indication information is described in detail below by using two cases as examples.

Case A: The first node is in an RRC connected state.

If the first node has only one parent node, the first node determines, based on the backhaul link failure indication link indication, that a link between the first node and the second IAB node fails or the first node triggers an RRC re-establishment procedure.

Case B: The first node is in an RRC idle state.

The first node triggers cell reselection.

Based on the wireless backhaul link failure indication information, the first node can sense a link status of the backhaul link between the second IAB node and the parent node of the second IAB node. When the backhaul link between the second IAB node and the parent node of the second IAB node fails or the RRC re-establishment fails, the first node may perform cell reselection or RRC re-establishment in advance, to search for a new parent node for access. This effectively reduces a time period of data transmission interruption caused by the link failure of the backhaul link between the second IAB node and the parent node of the second IAB node or the RRC re-establishment failure.

The foregoing describes in detail the data transmission method in the embodiments of this application with reference to FIG. 1 to FIG. 11. The following describes in detail an apparatus used in a wireless backhaul network in the embodiments of this application with reference to FIG. 12 and FIG. 13.

Figure 12:
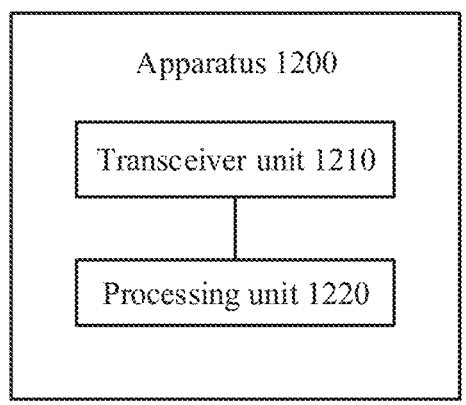
FIG. 12 is a schematic block diagram of an apparatus used in a wireless backhaul network according to embodiments of this application.

FIG. 12 shows an apparatus 1200 used in a wireless backhaul network according to an embodiment of this application. The apparatus 1200 may be a first IAB node, or may be a chip in the first IAB node. Alternatively, the apparatus 1200 may be a donor base station, or may be a chip in the donor base station. Alternatively, the apparatus 1200 may be a first node, or may be a chip in the first node. Alternatively, the apparatus 1200 may be a second IAB node, or may be a chip in the second IAB node. The apparatus 1200 includes a transceiver unit 1210 and a processing unit 1220.

When the apparatus 1200 is a first IAB node, in a possible implementation, the apparatus 1200 is configured to perform procedures and steps corresponding to the first IAB node in the foregoing method 400.

The transceiver unit 1210 is configured to receive N data packets sent by a donor base station to a terminal device, where N is a positive integer, and N is greater than 1.

The processing unit 1220 is configured to determine a PDCP PDU SN of a first data packet in PDCP PDU SNs of the N data packets, where the PDCP PDU SN of the first data packet is a largest PDCP PDU SN in the PDCP PDU SNs of the N data packets, or the PDCP PDU SN of the first data packet is a largest PDCP PDU SN in consecutive PDCP PDU SNs starting from a smallest PDCP PDU SN in the PDCP PDU SNs that are of the N data packets and that are arranged in ascending order.

The transceiver unit is further configured to send first information to the donor base station, where the first information includes a value of the PDCP PDU SN of the first data packet.

The processing unit 1220 may be configured to perform step S420 in the method 400, and the transceiver unit 1210 may be configured to perform step S410 and step S430 in the method 400, and step S520 in the method 500.

When the apparatus 1200 is a first IAB node, in another possible implementation, the apparatus 1200 is configured to perform procedures and steps corresponding to the first IAB node in the foregoing method 800.

The transceiver unit 1210 is configured to receive fourth information from a second IAB node, where the fourth information is used to indicate whether a second transmission path is congested or fails, and the second transmission path is a backhaul link between the second IAB node and a donor base station.

The transceiver unit 1210 is further configured to send fifth information to the donor base station, where the fifth information is used to indicate whether a third transmission path is congested or fails, and the third transmission path includes a backhaul link between the first IAB node and the second IAB node and/or the second transmission path.

The transceiver unit 1210 may be configured to perform step S810 and step S820 in the method 800.

When the apparatus 1200 is a first IAB node, in another possible implementation, the 1200 is configured to perform procedures and steps corresponding to the first apparatus node in the foregoing method 200.

The processing unit 1220 is configured to determine information about a status level of a fourth transmission path, where the status level of the fourth transmission path includes one of M status levels of the fourth transmission path, where M is greater than or equal to 2, M is a positive integer, and the M status levels of the fourth transmission path are defined based on buffer usage of the fourth transmission path. The fourth transmission path is a backhaul link between the first IAB node and a parent node of the first IAB node, and/or the fourth transmission path is a backhaul link between the first IAB node and a child node of the first IAB node.

The transceiver unit 1210 is configured to send sixth information to a donor base station, where the sixth information is used to indicate the status level of the fourth transmission path, and the sixth information is included in a donor base station distributed unit status indication message.

The processing unit 1220 may be configured to perform step S910 in the method 900, and the transceiver unit 1210 may be configured to perform step S920 in the method 900.

When the apparatus 1200 is a donor base station, in a possible implementation, the apparatus 1200 is configured to perform procedures and steps corresponding to the donor base station in the foregoing method 400.

The transceiver unit 1210 is configured to send N data packets to a first IAB node, where the N data packets are data packets sent by the donor base station to a terminal device, N is a positive integer, and N is greater than 1.

The transceiver unit 1210 is further configured to receive first information sent by the first IAB node, where the first information includes a value of a PDCP PDU SN of a first data packet, and the PDCP PDU SN of the first data packet is a largest PDCP PDU SN in PDCP PDU SNs of the N data packets, or the PDCP PDU SN of the first data packet is a largest PDCP PDU SN in consecutive PDCP PDU SNs starting from a smallest PDCP SN in PDCP PDU SNs that are of the N data packets and that are arranged in ascending order.

The processing unit 1220 is configured to determine a congestion or failure status of a first transmission path based on the first information.

When the first IAB node communicates with the apparatus via a second IAB node, the first transmission path includes a backhaul link between the first IAB node and the second IAB node and a backhaul link between the second IAB node and the apparatus.

The processing unit 1220 may be configured to perform step S440 in the method 400 and step S520 in the method 500, and the transceiver unit 1210 may be configured to perform step S410 and step S430 in the method 400.

When the apparatus 1200 is a donor base station, in another possible implementation, the apparatus 1200 is configured to perform procedures and steps corresponding to the donor base station in the foregoing method 800.

The transceiver unit 1210 is configured to receive fifth information sent by a first IAB node, where the fifth information is used to indicate whether a third transmission path is congested or fails, and the third transmission path includes a backhaul link between the first IAB node and a second IAB node and/or a backhaul link between the second IAB node and the donor base station.

The processing unit 1220 is configured to determine, a congested or failed link on the third transmission path based on the fifth information.

The processing unit 1220 may be configured to perform step S830 in the method 800, and the transceiver unit 1210 may be configured to perform step S820 in the method 800.

When the apparatus 1200 is a donor base station, in another possible implementation, the apparatus 1200 is configured to perform procedures and steps corresponding to the donor base station in the foregoing method 900.

The transceiver unit 1210 is configured to receive sixth information sent by a first IAB node, where the sixth information is used to indicate a status level of a fourth transmission path, the sixth information is included in a donor base station distributed unit status indication message, and the status level of the fourth transmission path includes one of M status levels of the fourth transmission path, where M is greater than or equal to 2, M is a positive integer, and the M status levels of the fourth transmission path are defined based on buffer usage of the fourth transmission path. The fourth transmission path is a backhaul link between the first IAB node and a parent node of the first IAB node, and/or the fourth transmission path is a backhaul link between the first IAB node and a child node of the first IAB node.

The processing unit 1220 is configured to reconfigure an uplink-downlink slot resource configuration of the fourth transmission path based on the sixth information.

The processing unit 1220 may be configured to perform step S930 in the method 900, and the transceiver unit 1210 may be configured to perform step S930 in the method 900.

When the apparatus 1200 is a donor base station, in another possible implementation, the apparatus 1200 is configured to perform procedures and steps corresponding to the donor base station in the foregoing method 1000.

The transceiver unit 1210 is configured to receive seventh information sent by a first IAB node, where the seventh information includes a value of a PDCP PDU SN of a third data packet and a terminal device data radio bearer UE DRB, and the PDCP PDU SN of the third data packet is a largest PDCP PDU SN in PDCP PDU SNs of R data packets successfully sent by the first IAB node to a terminal device in sequence, where R is greater than 1, and R is a positive integer.

The processing unit 1220 is configured to determine a congestion status of a fifth transmission path based on the seventh information, where the fifth transmission path includes a transmission path between the first IAB node and the donor base station and/or an access link between the first IAB node and the terminal device.

The processing unit 1220 may be configured to perform step S1020 in the method 1000, and the transceiver unit 1210 may be configured to perform step S1010 in the method 1000.

When the apparatus 1200 is a first node, in an implementation, the apparatus 1200 is configured to perform procedures and steps corresponding to the first node in the foregoing method 1100.

The transceiver unit 1210 is configured to receive wireless backhaul link failure indication information sent by a second IAB node, where the wireless backhaul link failure indication information is used to indicate that a wireless backhaul link between the second IAB node and a parent node of the second IAB node fails or RRC re-establishment fails.

The processing unit 1220 is configured to trigger RRC re-establishment or cell reselection based on the wireless backhaul link failure indication information.

The processing unit 1220 may be configured to perform step S1120 in the method 1100, and the transceiver unit 1210 may be configured to perform step S1110 in the method 1100.

When the apparatus 1200 is a second IAB node, in an implementation, the apparatus 1200 is configured to perform procedures and steps corresponding to the second IAB node in the foregoing method 1100.

The processing unit 1220 is configured to determine wireless backhaul link failure indication information, where the wireless backhaul link failure indication information is used to indicate that a wireless backhaul link between the second IAB node and a parent node of the second IAB node fails or RRC re-establishment fails.

The transceiver unit 1210 is configured to send the wireless backhaul link failure indication information to a first node, where the first node is a first IAB node or a terminal device, and the second IAB node is a parent node of the first node.

The transceiver unit 1210 may be configured to perform step S1110 in the method 1100.

It should be understood that a specific process of performing a corresponding step by each unit has been described in detail in the foregoing method embodiments. For brevity, details are not described herein again.

It should be understood that, the apparatus 1200 herein is presented in a form of a function unit. The term "unit" herein may be an application-specific integrated circuit (ASIC), an electronic circuit, a processor (for example, a shared processor, a dedicated processor, or a group processor) configured to execute one or more software or firmware programs and a memory, a merged logic circuit, and/or another proper component that supports the described functions. In an optional example, a person skilled in the art may understand that the apparatus 1200 may be specifically the first IAB node in the foregoing embodiments, and the apparatus 1200 may be configured to perform procedures and/or steps corresponding to the first IAB node in the foregoing method embodiments. Alternatively, the apparatus 1200 may be specifically the donor base station in the foregoing embodiments, and the apparatus 1200 may be configured to perform procedures and/or steps corresponding to the donor base station in the foregoing method embodiments. Alternatively, the apparatus 1200 may be specifically the first node in the foregoing embodiments, and the apparatus 1200 may be configured to perform procedures and/or steps corresponding to the first node in the foregoing method embodiments. Alternatively, the apparatus 1200 may be specifically the second IAB node in the foregoing embodiments, and the apparatus 1200 may be configured to perform procedures and/or steps corresponding to the second IAB node in the foregoing method embodiments. To avoid repetition, details are not described herein again.

The apparatus 1200 in the foregoing solutions has a function of implementing a corresponding step performed by the donor base station in the foregoing methods. The function may be implemented by hardware, or may be implemented by hardware by executing corresponding software. The hardware or the software includes one or more modules corresponding to the foregoing function. For example, the transceiver unit may be replaced with a transmitter and a receiver, and another unit such as the processing unit may be replaced with a processor, to separately perform a sending and receiving operation and a related processing operation in the method embodiments. In addition, the transceiver unit in the apparatus 1200 may alternatively include a sending unit and a receiving unit. For performing a receiving-related operation, functions of the transceiver unit may be understood as a receiving operation performed by the receiving unit, and for performing a sending-related operation, a function of the transceiver unit may be understood as a sending operation performed by the sending unit.

In the embodiments of this application, the apparatus in FIG. 12 may alternatively be a chip or a chip system, for example, a system on chip (SoC). Correspondingly, the transceiver unit may be a transceiver circuit of the chip. This is not limited herein.

Figure 13:
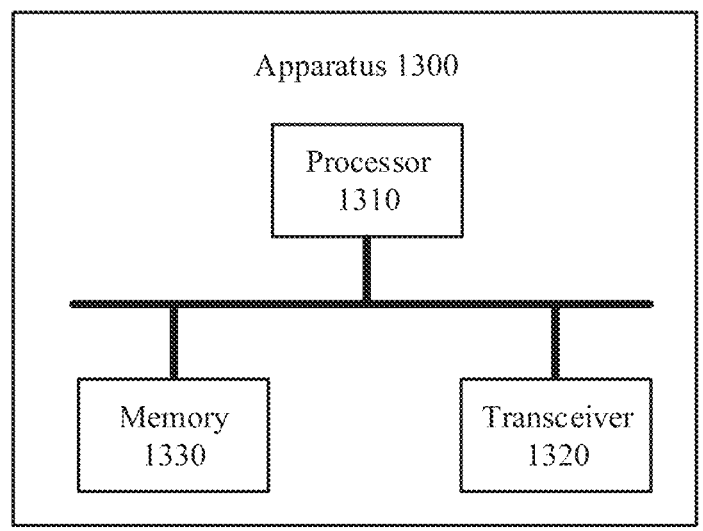
FIG. 13 is a schematic structural diagram of an apparatus used in a wireless backhaul network according to embodiments of this application.

FIG. 13 shows another apparatus 1300 used in a wireless backhaul network according to an embodiment of this application. It should be understood that the apparatus 1300 may be specifically the first IAB node in the foregoing embodiments, and may be configured to perform steps and/or procedures corresponding to the first IAB node in the foregoing method embodiments. Alternatively, the apparatus 1300 may be specifically the donor base station in the foregoing embodiments, and may be configured to perform steps and/or procedures corresponding to the donor base station in the foregoing method embodiments. Alternatively, the apparatus 1300 may be specifically the first node in the foregoing embodiments, and may be configured to perform steps and/or procedures corresponding to the first node in the foregoing method embodiments. Alternatively, the apparatus 1300 may be specifically the second IAB node in the foregoing embodiments, and may be configured to perform steps and/or procedures corresponding to the second IAB node in the foregoing method embodiments.

The apparatus 1300 includes a processor 1310, a transceiver 1320, and a memory 1330. The processor 1310, the transceiver 1320, and the memory 1330 communicate with each other by using an internal connection path. The processor 1310 may implement functions of the processing unit 1220 in various possible implementations of the apparatus 1200. The transceiver 1320 may implement functions of the transceiver unit 1210 in various possible implementations of the apparatus 1200. The memory 1330 is configured to store instructions, and the processor 1310 is configured to execute the instructions stored in the memory 1330. In other words, the processor 1310 may invoke the stored instructions to implement the functions of the processing unit 1220 in the apparatus 1200, to control the transceiver 1320 to send a signal and/or receive a signal.

Optionally, the memory 1330 may include a read-only memory and a random access memory, and provide instructions and data to the processor. A part of the memory may further include a nonvolatile random access memory. For example, the memory may further store information of a device type. The processor 1310 may be configured to execute the instructions stored in the memory; when the processor 1310 executes the instructions stored in the memory, the processor 1310 is configured to perform steps and/or procedures in the foregoing method embodiments corresponding to the first IAB node, the processor 1310 is configured to perform steps and/or procedures in the foregoing method embodiments corresponding to the donor base station, the processor 1310 is configured to perform steps and/or procedures in the foregoing method embodiments corresponding to the first node, or the processor 1310 is configured to perform steps and/or procedures in the foregoing method embodiments corresponding to the second IAB node.

It should be understood that in this embodiment of this application, the processor 1310 of the foregoing apparatus 1300 may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

In an implementation process, steps in the foregoing methods can be completed by using a hardware integrated logical circuit in the processor, or by using instructions in a form of software. The steps of the methods disclosed with reference to the embodiments of this application may be directly performed by a hardware processor, or may be performed by using a combination of hardware in the processor and a software unit. The software unit may be located in a mature storage medium in the art, such as a random access memory, a flash memory, a read-only memory, a programmable read-only t memory, an electrically erasable programmable memory, or a register. The storage medium is located in the memory, and the processor executes the instruction in the memory and completes the steps of the foregoing method in combination with the hardware of the processor. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiment is merely an example, example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
determining, by an integrated access and backhaul (IAB) node, a current status level of a transmission path, wherein the current status level of the transmission path includes one of M status levels of the transmission path, wherein M is greater than or equal to 2, M is a positive integer, and wherein the transmission path is a backhaul link between the IAB node and a parent node of the IAB node, or the transmission path is a backhaul link between the IAB node and a child node of the IAB node, and wherein the M status levels of the transmission path are defined based on a congestion status of the transmission path;
sending, by the IAB node, indication information to a donor base station, where the indication information indicates the current status level of the transmission path, wherein the indication information is included in a donor base station distributed unit status indication message;
receiving, by the IAB node, N data packets sent by the donor base station to a terminal device, wherein N is a positive integer, and N is greater than 1;
determining, by the IAB node, a packet data convergence protocol protocol data unit sequence number (PDCP PDU SN) of a first data packet in PDCP PDU SNs of the N data packets, wherein the PDCP PDU SN of the first data packet is a largest PDCP PDU SN in the PDCP PDU SNs of the N data packets, or the PDCP PDU SN of the first data packet is a largest PDCP PDU SN in consecutive PDCP PDU SNs starting from a smallest PDCP PDU SN in the PDCP PDU SNs that are of the N data packets and that are arranged in ascending order; and
sending, by the IAB node, first information to the donor base station, wherein the first information comprises a value of the PDCP PDU SN of the first data packet.

2. The method according to claim 1, wherein the M status levels of the transmission path are specified in a communication protocol, or the M status levels of the transmission path are configured by the donor base station.

3. The method according to claim 1, wherein the current status level of the transmission path determined by the IAB node indicates a severity level of the congestion status of the transmission path.

4. An apparatus, wherein the apparatus comprises at least one processor and at least one memory storing instructions and the instructions are executed by the at least one processor to cause the apparatus to perform operations comprising:
determining a current status level of a transmission path, wherein the current status level of the transmission path includes one of M status levels of the transmission path, wherein M is greater than or equal to 2, M is a positive integer, and wherein the transmission path is a backhaul link between the apparatus and a parent node of the apparatus, or the transmission path is a backhaul link between the apparatus and a child node of the apparatus, and wherein the M status levels of the transmission path are defined based on a congestion status of the transmission path;
sending indication information to a donor base station, where the indication information indicates the current status level of the transmission path, wherein the indication information is included in a donor base station distributed unit status indication message;
receiving N data packets sent by the donor base station to a terminal device, wherein N is a positive integer, and N is greater than 1;
determining a packet data convergence protocol protocol data unit sequence number (PDCP PDU SN) of a first data packet in PDCP PDU SNs of the N data packets, wherein the PDCP PDU SN of the first data packet is a largest PDCP PDU SN in the PDCP PDU SNs of the N data packets, or the PDCP PDU SN of the first data packet is a largest PDCP PDU SN in consecutive PDCP PDU SNs starting from a smallest PDCP PDU SN in the PDCP PDU SNs that are of the N data packets and that are arranged in ascending order; and
sending first information to the donor base station, wherein the first information comprises a value of the PDCP PDU SN of the first data packet.

5. The apparatus according to claim 4, wherein the M status levels of the transmission path are specified in a communication protocol, or the M status levels of the transmission path are configured by the donor base station.

6. The apparatus according to claim 4, wherein the current status level of the transmission path indicates a severity level of the congestion status of the transmission path.

7. A communication system comprising a donor base station and a IAB node;
wherein the IAB node comprises at least one first processor and at least one first memory storing first instructions and the first instructions are executed by the at least one first processor to cause the IAB node to perform first operations comprising:
determining a current status level of a transmission path, wherein the current status level of the transmission path includes one of M status levels of the transmission path, wherein M is greater than or equal to 2, M is a positive integer, and wherein the transmission path is a backhaul link between the IAB node and a parent node of the IAB node, or the transmission path is a backhaul link between the IAB node and a child node of the IAB node, and wherein the M status levels of the transmission path are defined based on a congestion status of the transmission path;
sending indication information to the donor base station, where the indication information indicates the current status level of the transmission path, wherein the indication information is included in a donor base station distributed unit status indication message;
receiving N data packets sent by the donor base station to a terminal device, wherein N is a positive integer, and N is greater than 1;
determining a packet data convergence protocol protocol data unit sequence number (PDCP PDU SN) of a first data packet in PDCP PDU SNs of the N data packets, wherein the PDCP PDU SN of the first data packet is a largest PDCP PDU SN in the PDCP PDU SNs of the N data packets, or the PDCP PDU SN of the first data packet is a largest PDCP PDU SN in consecutive PDCP PDU SNs starting from a smallest PDCP PDU SN in the PDCP PDU SNs that are of the N data packets and that are arranged in ascending order; and
sending first information to the donor base station, wherein the first information comprises a value of the PDCP PDU SN of the first data packet;
wherein the donor base station comprises at least one second processor and at least one second memory storing second instructions and the second instructions are executed by the at least one second processor to cause the donor base station to perform second operations comprising:

receiving from the IAB node, the indication information.

8. The system according to claim 7, wherein the M status levels of the transmission path are specified in a communication protocol, or the M status levels of the transmission path are configured by the donor base station.

9. The system according to claim 7, wherein the current status level of the transmission path indicates a severity level of the congestion status of the transmission path.

* * * * *